United States Patent
Herman et al.

(10) Patent No.: US 10,042,920 B2
(45) Date of Patent: Aug. 7, 2018

(54) CHART NAVIGATION SYSTEM

(71) Applicant: ADP, LLC, Roseland, NJ (US)

(72) Inventors: Matthew Paul Herman, Hoboken, NJ (US); Jordan Schiffer, Brooklyn, NY (US); Michael Ferron, New York, NY (US)

(73) Assignee: ADP, LLC, Roseland, NY (US)

( * ) Notice: Subject to any disclaimer, the term of this patent is extended or adjusted under 35 U.S.C. 154(b) by 554 days.

(21) Appl. No.: 14/661,386

(22) Filed: Mar. 18, 2015

(65) Prior Publication Data

US 2016/0275144 A1    Sep. 22, 2016

(51) Int. Cl.
*G06F 3/048*     (2013.01)
*G06F 17/30*    (2006.01)
*G06Q 10/06*    (2012.01)
*G06F 3/0481*   (2013.01)

(52) U.S. Cl.
CPC .. *G06F 17/30651* (2013.01); *G06F 17/30696* (2013.01); *G06Q 10/0631* (2013.01); *G06F 3/0481* (2013.01)

(58) Field of Classification Search
CPC .................................................. G06F 2216/15
See application file for complete search history.

(56) References Cited

U.S. PATENT DOCUMENTS

| | | | |
|---|---|---|---|
| 8,010,407 B1* | 8/2011 | Santoro | G06Q 30/02 705/14.4 |
| 8,434,001 B2 | 4/2013 | Kandekar et al. | |
| 8,667,400 B2 | 3/2014 | Berger et al. | |
| 2006/0020904 A1 | 1/2006 | Aaltonen et al. | |
| 2006/0156222 A1 | 7/2006 | Chi et al. | |
| 2007/0250478 A1 | 10/2007 | Copperman | |
| 2014/0337778 A1* | 11/2014 | Armitage | G06F 3/0484 715/771 |
| 2015/0074612 A1* | 3/2015 | Antipa | G06F 3/0482 715/854 |
| 2016/0241447 A1* | 8/2016 | Liu | H04L 41/22 |

FOREIGN PATENT DOCUMENTS

WO    02052448 A1    7/2002

OTHER PUBLICATIONS

Keahey, "IEEE Information Visualization 2005: Proceedings Compendium," IEEE Symposium on Information Visualization, Oct. 2005, Compendium compiled by Keahey, 150 pages.

* cited by examiner

*Primary Examiner* — Claudia Dragoescu
(74) *Attorney, Agent, or Firm* — Yee & Associates, P.C.

(57) ABSTRACT

A method for accessing information. Sections in a sunburst chart are displayed, by a computer system, in a graphical user interface in a display system. The sections represent the information and are displayed hierarchically in concentric circles. A section within an angle defined by an inner section relative to the section is associated with the inner section. A text search control is displayed, by the computer system, in the graphical user interface. The text search control receives text through user input. A selection of a plurality of sections displayed in the graphical user interface is identified, by the computer system, from the user input to the text search control. The plurality of sections in a different one of the concentric circles is emphasized, by the computer system, in the graphical user interface. The plurality of sections is associated with each other and enables increased efficiency in viewing the information.

23 Claims, 18 Drawing Sheets

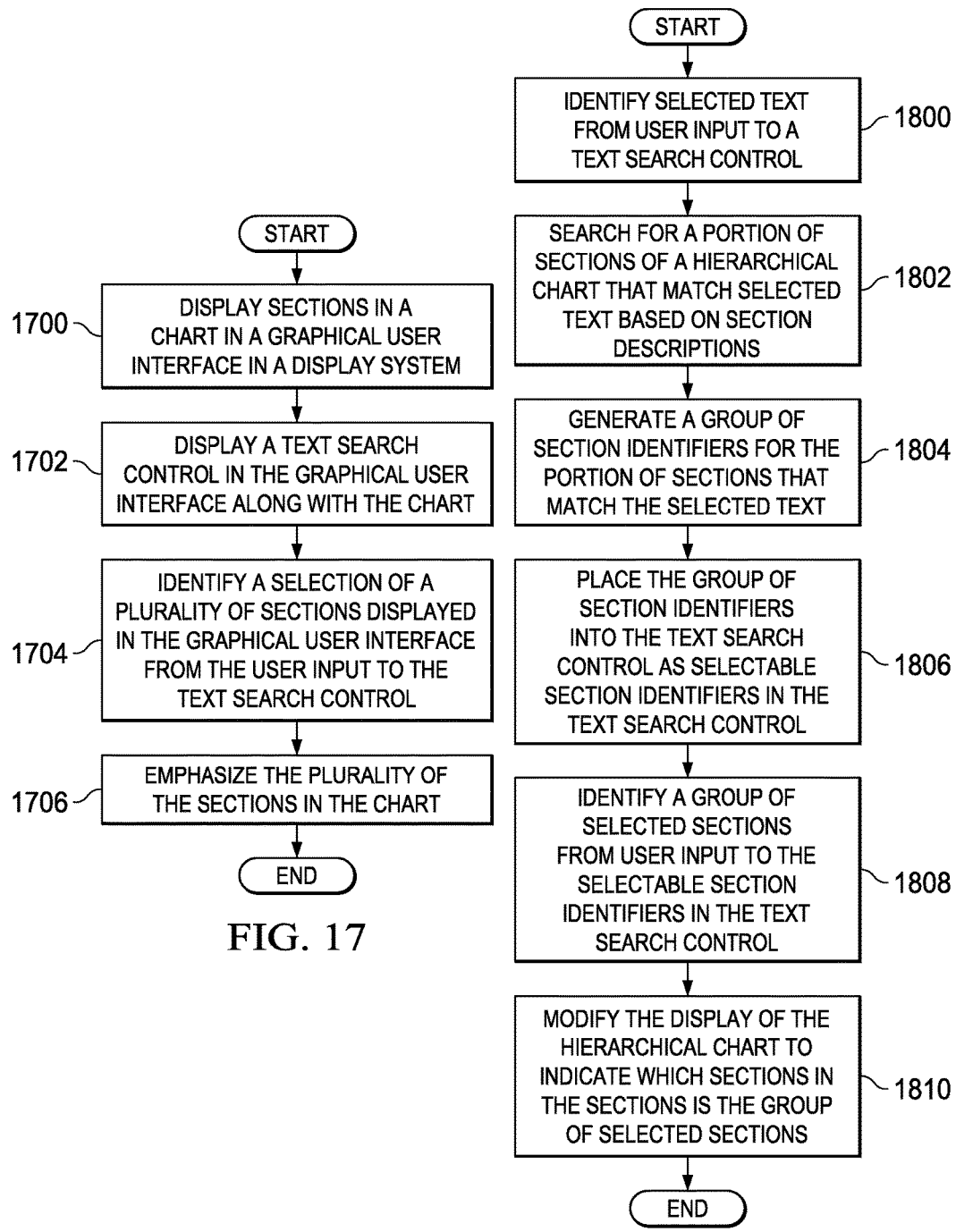

CHART NAVIGATION SYSTEM

BACKGROUND INFORMATION

1. Field

The present disclosure relates generally to an improved computer system, and in particular, to a method and apparatus for identifying information in a computer system. Still more particularly, the present disclosure relates to a method and apparatus for identifying information in a chart displayed in a computer system.

2. Background

Large collections of information are available for various areas of interest. The collections of information may be databases that can be accessed on networks such as the Internet, a company intranet or some other suitable type of network. The databases may include payroll data, benefits information, workforce demographics information, job data, company information, and other suitable types of information These databases are often used by people performing operations in an organization. For example, a person may compare the compensation for employees in the company with the compensation received by the workforce in a geographic area. The geographic area may be a state, a region, or an entire country. Based on comparing the compensation information, changes to compensation may be made for employees in the company. These changes may be performed to increase retention of employees.

The comparison may be made by making a database search in a database containing payroll data. The results of the database search may be returned as a record displayed on a display system.

When large amounts of information are examined, reviewing results of a database search may be more cumbersome and time-consuming than desired. For example, comparing compensation information between employees in a company and employees in the workforce outside of the company involves comparing compensation for similar industries with similar jobs. Industries may have categories with subcategories. A category may have multiple subcategories. In some cases, additional subcategories may be present under the subcategories.

These categories and subcategories are levels in a hierarchy for industries. As the number of levels in the hierarchy increases, finding the correct information for comparisons may be more difficult and time-consuming than desired.

In some cases, charts may be used to more quickly find the desired information. For example, sunburst charts may be displayed to show hierarchies of categories for industries along with compensation for particular industries.

Although this type of format for visualizing information is more helpful than reviewing results of database searches, this type of visualization of information may still be more difficult and time-consuming than desired. With a large number of industries with large hierarchies, the sunburst chart may become hard to review with the large number of sections and the large number of concentric circles for the hierarchies.

Therefore, it would be desirable to have a method and apparatus that take into account at least some of the issues discussed above, as well as other possible issues. For example, it would be desirable to have a method and apparatus to solve a technical problem of visually searching for information displayed in charts having hierarchies.

SUMMARY

An embodiment of the present disclosure provides a method for accessing information. Sections in a sunburst chart are displayed, by a computer system, in a graphical user interface in a display system. The sections represent the information and are displayed hierarchically in concentric circles. A section within an angle defined by an inner section relative to the section is associated with the inner section. A text search control is displayed, by the computer system, in the graphical user interface. The text search control receives text through user input. A selection of a plurality of sections displayed in the graphical user interface is identified, by the computer system, from the user input to the text search control. The plurality of sections in a different one of the concentric circles is emphasized, by the computer system, in the graphical user interface. The plurality of sections is associated with each other and enables increased efficiency in viewing the information.

Another embodiment of the present disclosure provides a computer system comprising a display system and a viewer in communication with the display system. The viewer displays sections in a sunburst chart in a graphical user interface in the display system. The sections represent information and are displayed hierarchically in concentric circles. A section within an angle defined by an inner section relative to the section is associated with the inner section. The viewer displays a text search control in the graphical user interface. The text search control receives text through user input. The viewer identifies a selection of a plurality of sections displayed in the graphical user interface from the user input to the text search control. The viewer emphasizes the plurality of sections in a different one of the concentric circles in the graphical user interface. The plurality of sections is associated with each other and enables increased efficiency in viewing the information.

Another embodiment of the present disclosure provides a computer program product for accessing information. The computer program product comprises a computer readable storage media, and first program code, second program code, third program code, and fourth program code stored on the computer readable storage media. The first program code displays sections in a sunburst chart in a graphical user interface in a display system. The sections represent the information and are displayed hierarchically in concentric circles. A section within an angle defined by an inner section relative to the section is associated with the inner section. The second program code displays a text search control in the graphical user interface. The text search control receives text through user input. The third program code identifies a selection of a plurality of sections displayed in the graphical user interface from the user input to the text search control. The fourth program code emphasizes the plurality of sections in a different one of the concentric circles in the graphical user interface. The plurality of sections is associated with each other and enables increased efficiency in viewing the information.

Yet another embodiment of the present disclosure provides a method for accessing information. Sections in a hierarchical chart are displayed, by a computer system, in a graphical user interface in a display system. The sections represent the information, a first portion of the sections are located in a second portion of the sections, and the sections are displayed hierarchically in the hierarchical chart. A text search control is displayed, by the computer system, in the graphical user interface. The text search control receives text through user input. A selection of a plurality of sections displayed in the graphical user interface is identified, by the computer system, from the user input to the text search control. The plurality of sections is emphasized, by the computer system, in the graphical user interface. The plurality of sections is associated with each other in the hierarchy of the information and enables increased efficiency in viewing the information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a flowchart of a process for accessing information in accordance with an illustrative embodiment;

FIG. 18 is an illustration of a flowchart of a process for searching for desired information in a chart using a text search control in accordance with an illustrative embodiment.

DETAILED DESCRIPTION

The illustrative embodiments recognize and take into account one or more different considerations. The illustrative embodiments recognize and take into account that finding information using a circular chart, such as a sunburst chart, may be more difficult than desired. As the number of items and hierarchies increase, navigating a sunburst chart becomes more difficult. The illustrative embodiments recognize and take into account that as the number of items and the number of hierarchies increase, the visualization of the information becomes more complex and difficult to review as quickly as desired. As a result, the sunburst chart may be useful for browsing information, but is less useful for searching specific information that may be desired.

Thus, the illustrative embodiments provide a method and apparatus for displaying information. In one illustrative example, a computer system displays sections in a sunburst chart in a display system. The sections represent the information and are displayed hierarchically in concentric circles, and a section within an angle defined by an inner section relative to the section is associated with the inner section. The computer system displays a text search control that receives text through user input. The computer system also identifies a selection of a plurality of sections displayed in the display system from the user input to the text search control. The plurality of the sections in a different one of the concentric circles is emphasized by the computer system, wherein the plurality of sections is associated with each other and enables increased efficiency in viewing the information.

Figure 1:
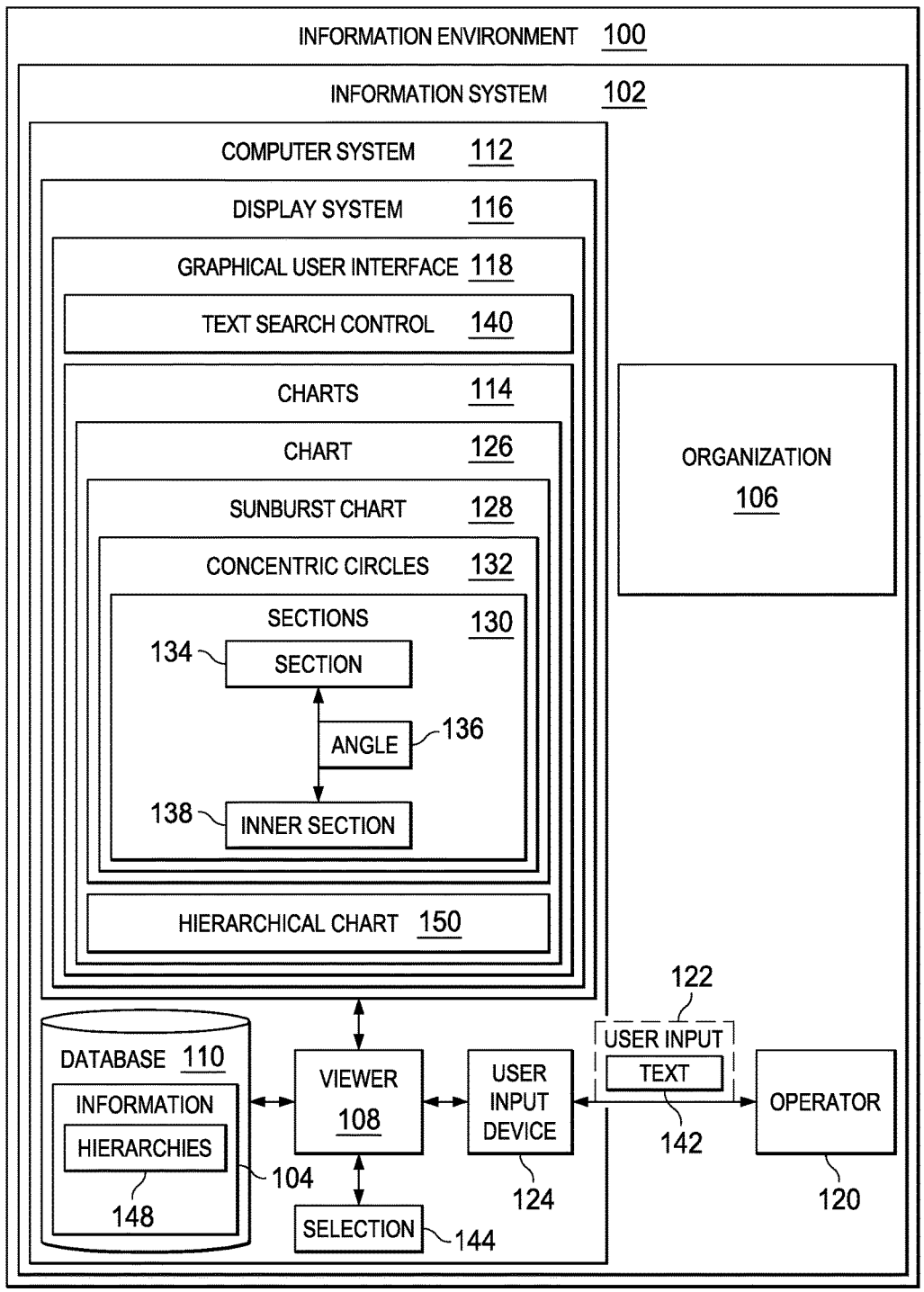
FIG. 1 is an illustration of a block diagram of an information environment in accordance with an illustrative embodiment.

With reference now to the figures, and in particular, with reference to FIG. 1, an illustration of a block diagram of an information environment is depicted in accordance with an illustrative embodiment. In this depicted example, information environment 100 includes information system 102. Information system 102 manages information 104 about organization 106.

Organization 106 may be, for example, a corporation, a partnership, a charitable organization, a city, a government agency, or some other suitable type of organization. Information 104 about organization 106 may include, for example, at least one of information about people, products, research, product analysis, business plans, financials, or other types information relating to organization 106.

As used herein, the phrase "at least one of," when used with a list of items, means different combinations of one or more of the listed items may be used and only one of each item in the list may be needed. In other words, "at least one" of means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information system 102 may be selected from one of an employee information system, a research information system, a sales information system, an accounting system, a payroll system, or some other type of information system that provides access to information 104 about organization 106.

In this illustrative example, information system 102 includes a number of different components. As depicted, information system 102 includes viewer 108 and database 110. Viewer 108 and database 110 may be implemented in computer system 112.

As depicted, viewer 108 provides access to information 104 using charts 114. Viewer 108 may be implemented in software, hardware, firmware, or a combination thereof. When software is used, the operations performed by viewer 108 may be implemented in program code configured to run on hardware, such as a processor unit. When firmware is used, the operations performed by viewer 108 may be implemented in program code and data and stored in persistent memory to run on a processor unit. When hardware is employed, the hardware may include circuits that operate to perform the operations in viewer 108.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, computer system 112 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In this illustrative example, display system 116 is a hardware system and includes one or more display devices on which graphical user interface 118 may be displayed. Operator 120 may interact with graphical user interface 118 through user input 122 generated by user input device 124 in computer system 112. User input device 124 may be, for example, a mouse, a keyboard, a trackball, a touchscreen, a stylus, or some other suitable type of input device. For example, a pointer may be displayed in graphical user interface 118 that corresponds to user input device 124. In this example, user input device 124 moves the pointer to perform at least one of selecting operations or drag and drop operations in graphical user interface 118. Graphical user interface 118 may include a data input interface that receives user input 122 generated by user input device 124 in computer system 112. Graphical user interface 118 may also include a graphic rendering engine that draws and re-draws charts 114 on one or more display devices.

In the illustrative example, viewer 108 provides access to information 104 in different forms. For example, the access may be selected from at least one of reading, writing, or modifying information 104. As depicted, this access is facilitated through the use of charts 114 displayed in graphical user interface 118.

In this illustrative example, chart 126 in charts 114 is sunburst chart 128. As depicted, sunburst chart 128 is a pie chart that is circular and divided into sections. Sunburst chart 128 provides an ability to visualize information 104 in database 110.

As depicted, sections 130 in sunburst chart 128 represent information 104. Sections 130 are displayed hierarchically in concentric circles 132.

In this illustrative example, section 134 with angle 136 is defined by inner section 138 relative to section 134 and is associated with inner section 138. In other words, inner section 138 is located in an inner circle in concentric circles 132 in sunburst chart 128. Inner section 138 has a hierarchical relationship to sections 130 located in an outer circle in concentric circles 132 with respect to the inner circle and within an angular sweep of the inner section 138.

In operation, viewer 108 in computer system 112 displays sections 130 in sunburst chart 128 in graphical user interface 118 in display system 116. In this illustrative example, viewer 108 also displays text search control 140. In this illustrative example, text search control 140 may receive text 142 through user input 122 from operator 120 using user input device 124.

Text search control 140 may take a number of different forms. For example, text search control 140 may be selected from one of a field in which text 142 may be entered through user input device 124, a drop-down box with text 142, a drop-down menu with text 142, a group of check boxes for text 142, a group of radio buttons for text 142, a spinner with text 142, a slider to select text 142, or other suitable types of controls for inputting text 142.

As used herein, "a group of," when used with reference to items, mean one or more items. For example, a group of check boxes is one or more check boxes.

As depicted, viewer 108 identifies selection 144 of a plurality of sections 130 displayed in graphical user interface 118 in display system 116 from user input 122 to text search control 140. Additionally, viewer 108 emphasizes the plurality of sections 130 in a different one of concentric circles 132. The plurality of sections 130 is associated with each other. In this manner, viewer 108 enables increased efficiency in viewing information 104.

In the illustrative example, the emphasis of the plurality of sections 130 is a graphical emphasis. The graphical emphasis may be made using a graphical indication in association with the plurality of sections 130. The graphical indication may be selected from at least one of highlighting, bolding, animation, an icon, text, italic, font size, color, or other suitable graphical indicators.

For example, the graphical emphasis may be made by displaying the lines defining the sections with a color different from other sections. The lines may be made bold or thicker. An icon may be displayed with each of the plurality of sections 130. The text in the plurality of sections 130 may be displayed using at least one of a different font, highlighting, bolding, or other graphical indicators.

In this manner, the illustrative example provides a technical solution to the technical problem of visually searching for information 104 displayed in charts 114 in which information 104 has hierarchies 148. The technical effect of the solution is the accessing information 104 is made easier as compared to currently used systems for accessing information with charts without viewer 108. For example, searching for desired information in information 104 in chart 126 is easier with the addition of text search control 140 displayed in graphical user interface 118 along with chart 126.

In this illustrative example, computer system 112 operates as a special purpose computer system in which viewer 108 in computer system 112 enables visualizing information 104 and searching for information 104. In particular, viewer 108 transforms computer system 112 into a special purpose computer system as compared to currently available general computer systems that do not have viewer 108. With viewer 108 searching for information 104, searching for information 104 is at least one of less complicated or faster as compared to current systems that display charts. With text search control 140 provided by viewer 108, searching for information 104 having hierarchies 148 is easier with chart 126. In particular, as the amount of information 104 increases and hierarchies 148 in information 104 increase, searching for desired information in information 104 is easier with text search control 140 displayed in conjunction with sunburst chart 128.

Computer system 112 performs a transformation of information 104. For example, information 104 is transformed from a form for storage in database 110 to a form for display in graphical user interface 118 in display system 116. The form of information 104 for display is a graphical form using chart 126 as opposed to records or tables in database 110. In this manner, information 104 changes such that the data has a different function or has a different use when displayed using chart 126 as compared to the form as stored in database 110.

The illustration of information environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other types of charts 114 in addition to or in place of sunburst chart 128 may be displayed for access on graphical user interface 118 by viewer 108. For example, text search control 140 may be displayed along with hierarchical chart 150. Sunburst chart 128 is a type of hierarchical chart 150.

As depicted, hierarchical chart 150 is any chart that displays information 104 in a manner that shows hierarchies 148 in information 104. In the illustrative example, hierarchies 148 are shown graphically to provide a visualization of hierarchies 148 in hierarchical chart 150 to operator 120.

For example, with hierarchical chart 150, viewer 108 in computer system 112 displays sections 130 in hierarchical chart 150 in graphical user interface 118 in display system 116. In this illustrative example, sections 130 in hierarchical chart 150 represent information 104, a first portion of sections 130 is located in a second portion of sections 130, and is displayed hierarchically in hierarchical chart 150.

Text search control 140 is a graphical element and is displayed in graphical user interface 118 along with hierarchical chart 150. Text search control 140 receives text 142 through user input 122. In this illustrative example, user input 122 enters text 142 into text search control 140. In another example, user input 122 may select options for text 142 through text search control 140.

Selection 144 of a plurality of sections 130 displayed in graphical user interface 118 is identified from user input 122 to text search control 140. The plurality of sections 130 in graphical user interface 118 is emphasized. The plurality of sections 130 is associated with each other in hierarchies 148 in information 104, enabling increased efficiency in viewing information 104.

In another illustrative example, a bar chart is another example of hierarchical chart 150 in which sections 130 represent information 104. Also, a first portion of sections 130 is located in a second portion of sections 130 in the bar chart and is displayed hierarchically in the bar chart. A bar within the bar chart may have sections that represent hierarchies of information. Text search control 140 may be displayed in graphical user interface 118 along with the bar chart to enable increased efficiency in viewing information 104.

As another example, one or more text search controls may be displayed in graphical user interface 118 in display system 116 in addition to or in place of text search control 140. Further, other types of graphical controls also may be displayed in addition to text search control 140. For example, graphical controls may be displayed to allow operator 120 to select different data sets or databases containing information other than information 104.

Figure 2:
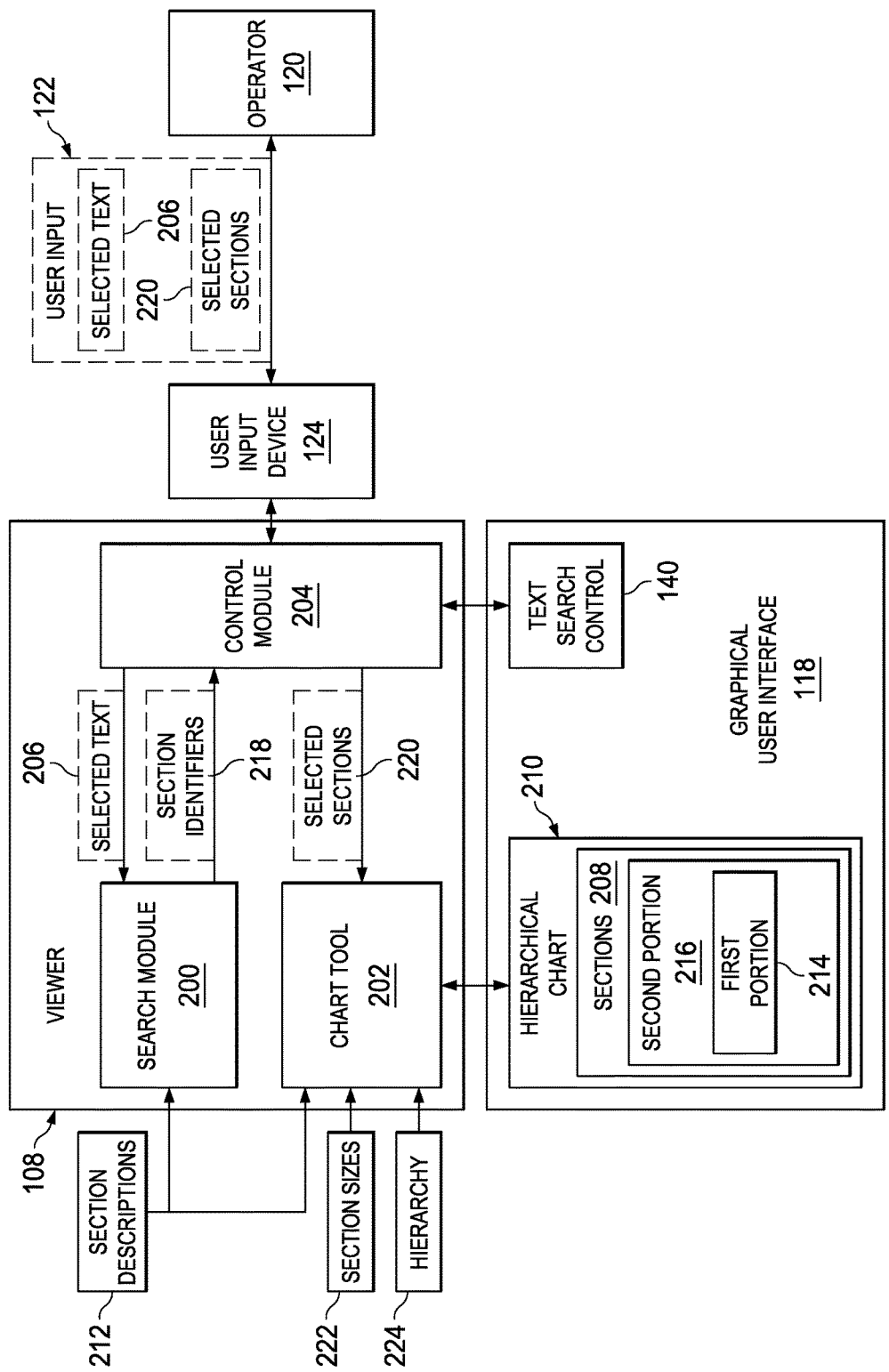
FIG. 2 is an illustration of a block diagram of data flow for searching for desired information in a chart using a text search control in accordance with an illustrative embodiment.

With reference next to FIG. 2, an illustration of a block diagram of data flow for searching for desired information in a chart using a text search control is depicted in accordance with an illustrative embodiment. In this figure, an example of data flow of a process searching for information 104 in hierarchical chart 150 through viewer 108 is shown. In the illustrative examples, the same reference numeral may be used in more than one figure. This reuse of a reference numeral in different figures represents the same element in the different figures.

In this illustrative example, viewer 108 has a number of different components. As depicted, viewer 108 includes search module 200, chart tool 202, and control module 204.

Control module 204 displays text search control 140 on graphical user interface 118. Control module 204 receives user input 122 to text search control 140 through user input device 124.

In this illustrative example, search module 200 receives selected text 206 from control module 204. Selected text 206 is desired information in information 104 in chart 126. In the illustrated example, control module 204 identifies selected text 206 from a first user input in user input 122.

Search module 200 searches for a portion of sections 208 in hierarchical chart 210 matching selected text 206 based on section descriptions 212. The portion of sections 208 is a group of sections 208. A section description is text that describes a section of a chart. Section descriptions 212 include at least one of titles, summaries, or other suitable types of descriptions for sections of a hierarchical chart. Hierarchical chart 210 is an example of hierarchical chart 150 in FIG. 1.

As depicted, sections 208 in hierarchical chart 210 include first portion 214 of sections 208 in second portion 216 of sections 208. Chart tool 202 displays first portion 214 and second portion 216 hierarchically.

Search module 200 generates a group of section identifiers 218 for the portion of sections 208 that match selected text 206. A section identifier is a pointer to the section. For example, the section identifier may be the title of the section.

Control module 204 receives the group of section identifiers 218 from search module 200. Control module 204 places the group of section identifiers 218 into text search control 140 as selectable section identifiers in text search control 140.

In this illustrative example, chart tool 202 receives selected sections 220 from control module 204. In the illustrated example, control module 204 identifies a group of selected sections 220 from a second user input in user input 122 to the selectable section identifiers in text search control 140. In other words, the group of selected sections 220 is a portion of section identifiers 218 that operator 120 has selected. Selected sections 220 is a group of sections in sections 208.

Chart tool 202 then modifies the display of hierarchical chart 210 in graphical user interface 118 to indicate which sections in sections 208 are the group of selected sections 220. In this illustrative example, chart tool 202 may indicate which sections in sections 208 are the group of selected sections 220 by at least one of removing from sections 208 any sections not in the group of selected sections 220, or by highlighting the group of selected sections 220 in sections 208 through graphical emphasis.

In this illustrative example, chart tool 202 changes the display of sections 208 in hierarchical chart 210 when removing from sections 208 any sections not in the group of selected sections 220. These changes are based on at least one of section descriptions 212, section sizes 222, or hierarchy 224. For example, chart tool 202 may resize the group of selected sections 220 based on section sizes 222 and hierarchy 224.

As depicted, hierarchy 224 is an example of a hierarchy in hierarchies 148 for information 104. In this illustrative example, section sizes 222 are based on at least one of relative weightings between sections 208 in hierarchy 224 or relative percentages of a total for hierarchy 224.

Section sizes 222 may be identified by at least one of information system 102 or chart tool 202 based on information 104. For example, section sizes 222 may be percentages of employees in the sections of organization 106.

The illustration of information environment 100 and the different components in information environment 100 in FIGS. 1 and 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In another illustrative example, viewer 108 may be located in another computer system in information environment 100 in FIG. 1. In still another illustrative example, database 110 may be omitted from computer system 112.

As another example, additional hierarchical charts may be displayed by chart tool 202. For example, each time chart tool 202 receives selected sections 220, another hierarchical chart may be generated for selected sections 220.

Figure 3:
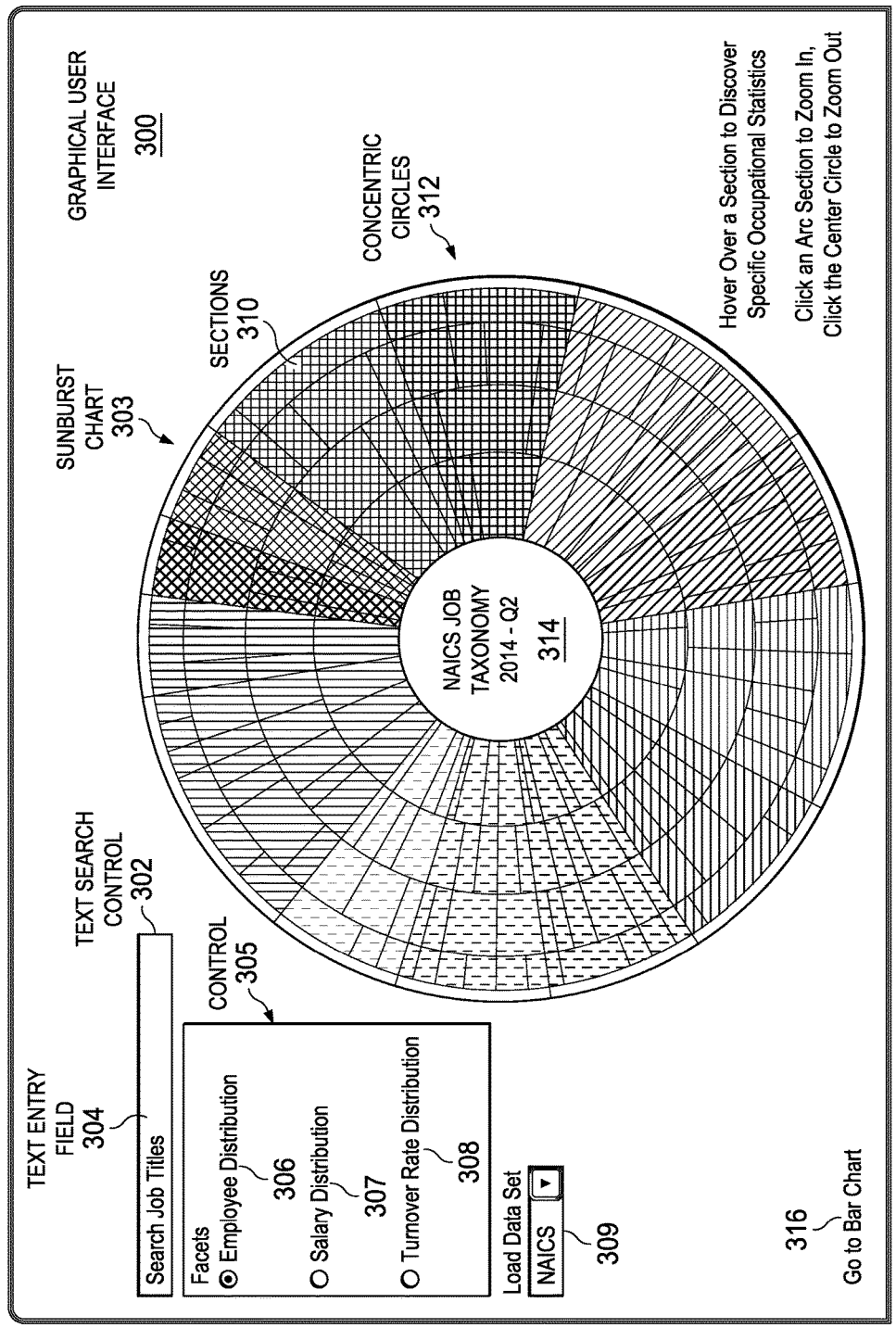
FIG. 3 is an illustration of a sunburst chart with a text search control in a graphical user interface in accordance with an illustrative embodiment.

FIGS. 3-16 are illustrative examples of a graphical user interface that may be used to search for desired information in a chart using a text search control. With reference first to FIG. 3, an illustration of a sunburst chart with a text search control in a graphical user interface is depicted in accordance with an illustrative embodiment. As depicted, graphical user interface 300 is an example of one implementation for graphical user interface 118 shown in block form in FIG. 1.

In this illustrative example, graphical user interface 300 includes a number of different graphical elements. As depicted, graphical user interface 300 includes text search control 302 and sunburst chart 303.

Text search control 302 is an example of text search control 140 shown in block diagram form in FIGS. 1-2. Sunburst chart 303 is an example of sunburst chart 128 shown in block diagram form in FIG. 1.

Text search control 302 includes text entry field 304. Text entered into text entry field 304 is an example of selected text 206 in FIG. 2.

As depicted, graphical user interface 300 also includes control 305. In this illustrative example, control 305 includes radio button 306, radio button 307, and radio button 308. One of the radio buttons may be selected for choosing the type of information that is displayed in sunburst chart 303.

In this illustrative example, radio button 306 has been selected. This radio button is for choosing "employee distribution" as the type of information. Employee distribution is the number of employees in sections of an organization. Employee distribution is an example of a type of information in information 104 in FIG. 1.

Graphical user interface 300 further includes control 309. Control 309 provides an ability to select names of organizations. Selection of a name of an organization causes information for the organization selected to be shown in sunburst chart 303.

In this illustrative example, sections 310 are graphically displayed in sunburst chart 303. Sections 310 represent the employee distribution for sections of organization 106. As depicted, the size of each section in sections 310 is based on the number of employees in the section. Sections 310 are an example of sections 130 shown in block diagram form in FIG. 1.

As depicted, concentric circles 312 are graphically displayed in sunburst chart 303. Concentric circles 312 represent levels of hierarchy for sections 310. This hierarchy is an example of hierarchies 148 shown in block diagram form in FIG. 1. Concentric circles 312 located toward the center of sunburst chart 303 represent higher levels of hierarchy for sections 310 than concentric circles 312 located toward the outside of sunburst chart 303.

In the illustrative example, the concentric circle in the concentric circles 312 that is located furthest to the outside of sunburst chart 303 includes sections in sections 310 that may be referred to as leaf nodes. These leaf nodes are the sections in sections 310 having a lowest level of the hierarchy for sections 310.

As depicted, graphical user interface 300 displays sections 310 using different colors. The sections in sections 310 referred to as leaf nodes may be shown using a different color than the other sections in sections 310. For example, gray can be used for the leaf nodes in sections 310 and other colors may be used for the sections in sections 310 that are not leaf nodes.

In this illustration, information circle 314 in sunburst chart 303 includes the name of the organization selected in control 309 and the type information shown in sunburst chart 303.

Link 316 in graphical user interface 300 is selected to switch to another type graphical user interface. In this illustrative example, link 316 points to a graphical user interface that displays bar charts.

Figure 4:
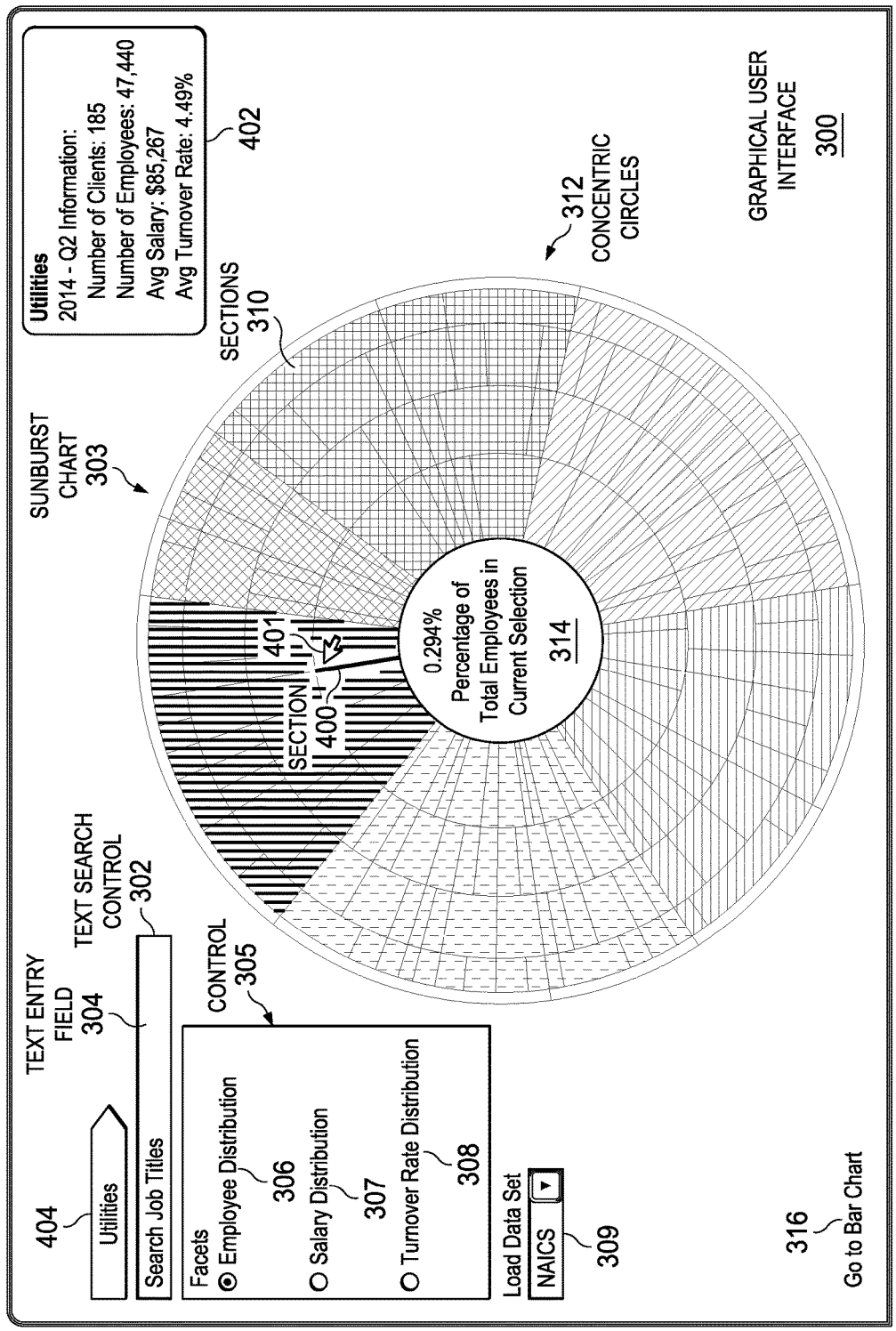
FIG. 4 is an illustration of an emphasized section in a sunburst chart in a graphical user interface in accordance with an illustrative embodiment.

Turning next to FIG. 4, an illustration of an emphasized section in a sunburst chart in a graphical user interface is depicted in accordance with an illustrative embodiment. In this illustrative example, section 400 is emphasized in graphical user interface 300. Section 400 represents the number of employees in the utilities section of organization 106.

The emphasis of section 400 may be made using a graphical indicator. In this example, the graphical indicator is a highlighting of section 400 by an operator. In this illustrative example, section 400 is highlighted when the operator moves pointer 401 over section 400. Graphical user interface 300 identifies section 400 as the location of pointer 401 relative to other sections in sunburst chart 303.

As depicted, section 400 is a relatively small portion of sunburst chart 303. As a result, finding section 400 in sunburst chart 303 may be more difficult and time-consuming than desired.

In this illustration, information circle 314 in sunburst chart 303 includes text describing the percentage of total employees in section 400 for organization 106. As depicted, the size of section 400 in sunburst chart 303 is based on a percentage of the total employees in section 400 for organization 106.

In this illustrative example, graphical user interface 300 includes information box 402. Information box 402 shows portions of information 104 associated with section 400. Graphical user interface 300 includes segment 404 for section 400. Graphical user interface 300 shows segment 404 as an additional emphasis on section 400.

As depicted, segment 404 represents section 400. In this illustrative example, segment 404 is a portion of a bar. Graphical user interface 300 may extend the bar by adding additional segments to the bar. In other words, the bar represents a group of sections for which graphical user interface 300 is showing emphasis.

Figure 5:
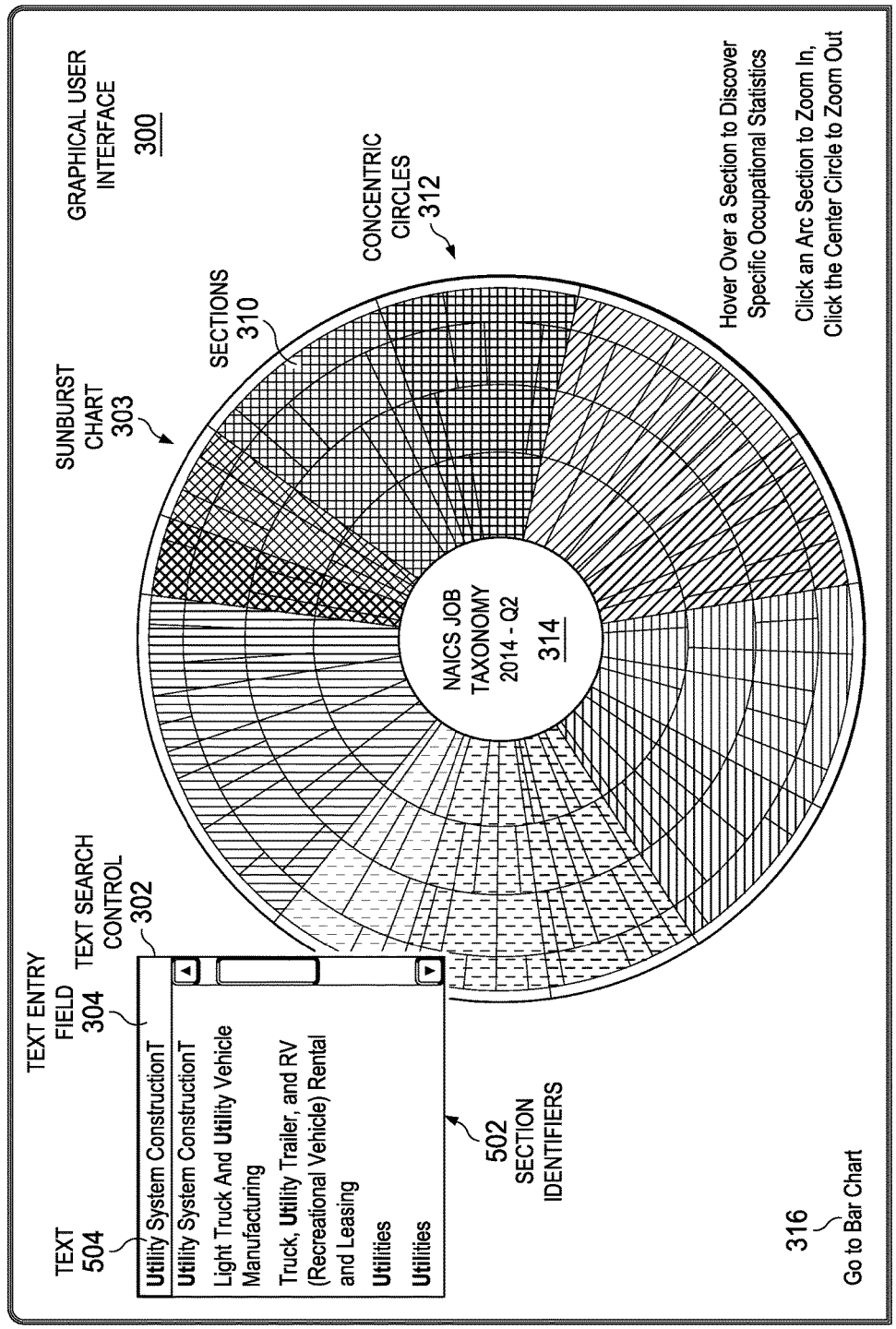
FIG. 5 is an illustration of text entered into a text search control for a sunburst chart in a graphical user interface in accordance with an illustrative embodiment.

Turning to FIG. 5, an illustration of text entered into a text search control for a sunburst chart in a graphical user interface is depicted in accordance with an illustrative embodiment. In this illustrative example, section identifiers 502 are included in text search control 302. Section identifiers 502 are an example of an implementation for section identifiers 218 shown in block diagram form in FIG. 2.

As depicted, text 504 in text search control 302 includes the text "util." In the illustrated example, text 504 has been entered by operator 120. The section identifiers 502 match identifiers included in section text 504. As also depicted, an emphasis for the text "util" is shown on section identifiers 502 to emphasize the match.

Figure 6:
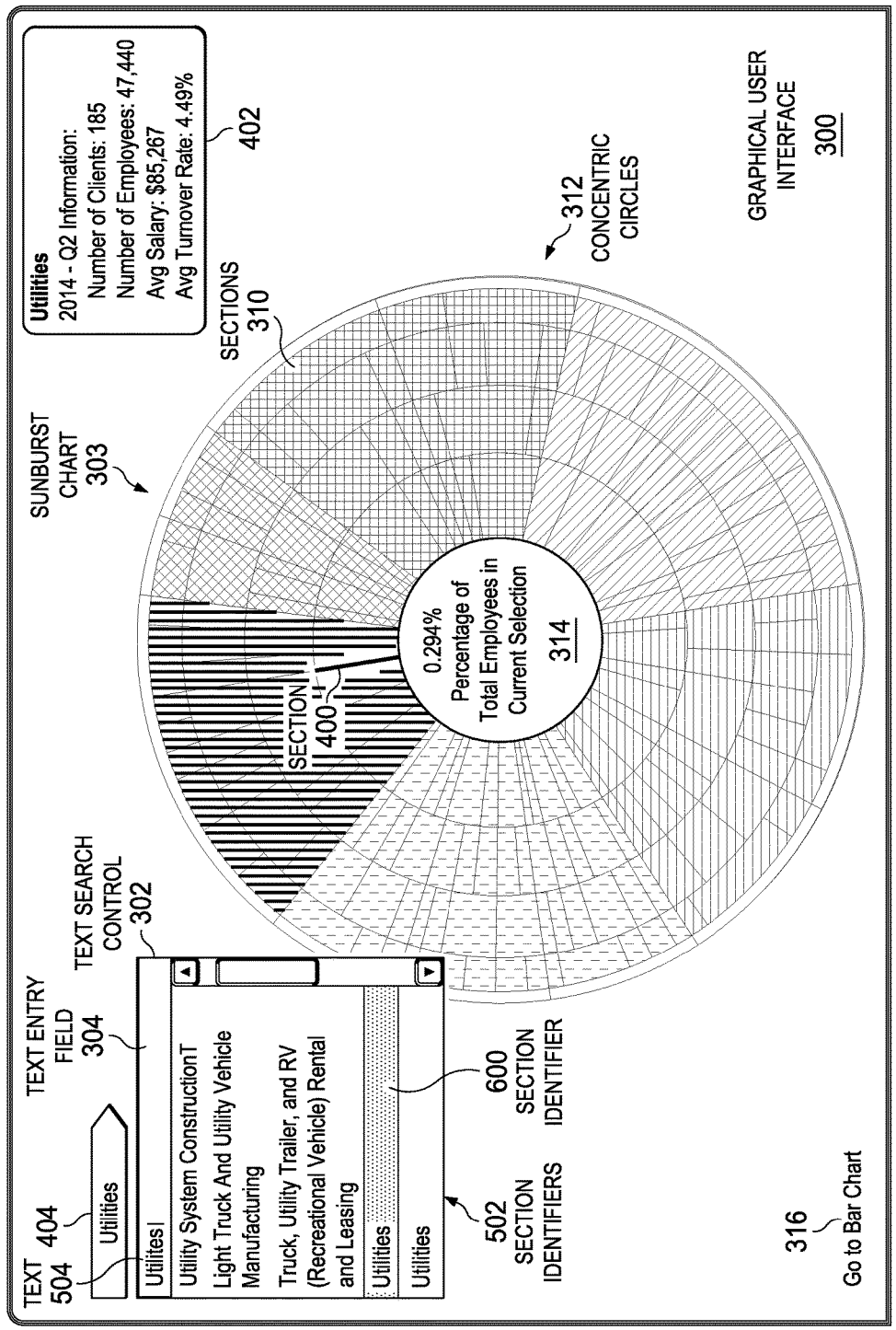
FIG. 6 is an illustration of an emphasized section in a sunburst chart in a graphical user interface in accordance with an illustrative embodiment.

Turning now to FIG. 6, an illustration of an emphasized section in a sunburst chart in a graphical user interface is depicted in accordance with an illustrative embodiment. In this illustration, section identifier 600 is highlighted in section identifiers 502.

In this illustrative example, section identifier 600 is highlighted based on user input to text search control 302. Highlighting a section identifier in section identifiers 502 may be performed by at least one of moving a pointer over the section identifier, moving a highlight bar with a keyboard, or some other suitable way to highlight the section identifier in section identifiers 502.

As depicted, section identifier 600 is "utilities" which points to section 400. As depicted, graphical user interface 300 emphasizes section 400 when section identifier 600 is highlighted.

Figure 7:
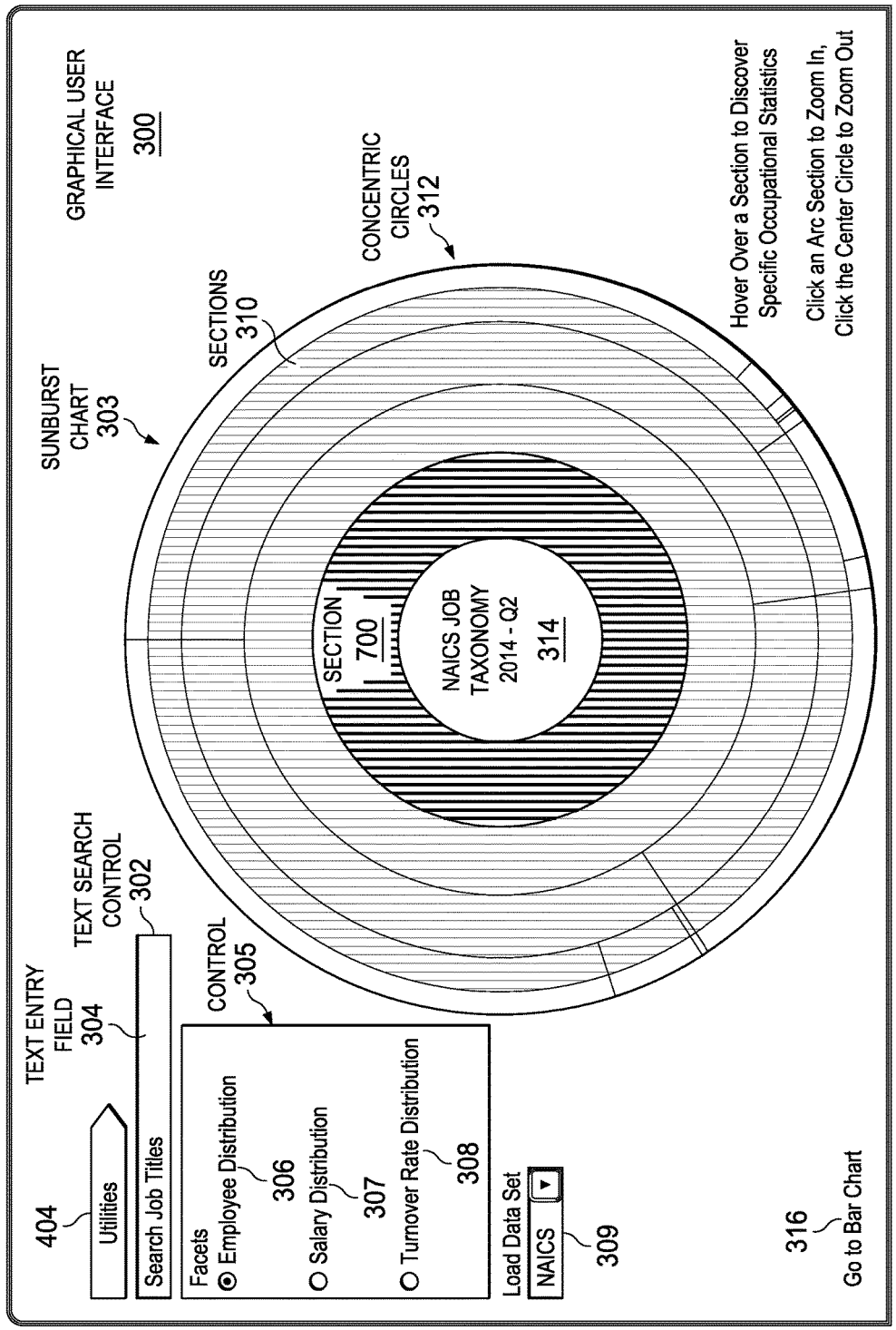
FIG. 7 is an illustration of a sunburst chart in a graphical user interface in accordance with an illustrative embodiment.

In FIG. 7, an illustration of a sunburst chart in a graphical user interface is depicted in accordance with an illustrative embodiment. In this illustration, section identifier 600 in FIG. 6 has been selected.

As depicted, graphical user interface 300 removes from sections 310 the portion of sections 310 that is not in section 400 in FIGS. 4-6 when section identifier 600 is selected in FIG. 6. Section 700 in sunburst chart 303 represents the same section in organization 106 that section 400 represented in FIGS. 4-6.

In this illustrative example, graphical user interface 300 shows emphasis on section 700 when section identifier 600 is selected in FIG. 6. Graphical user interface 300 includes segment 404 for section 700. Graphical user interface 300 shows segment 404 as an additional emphasis on section 700.

Figure 8:
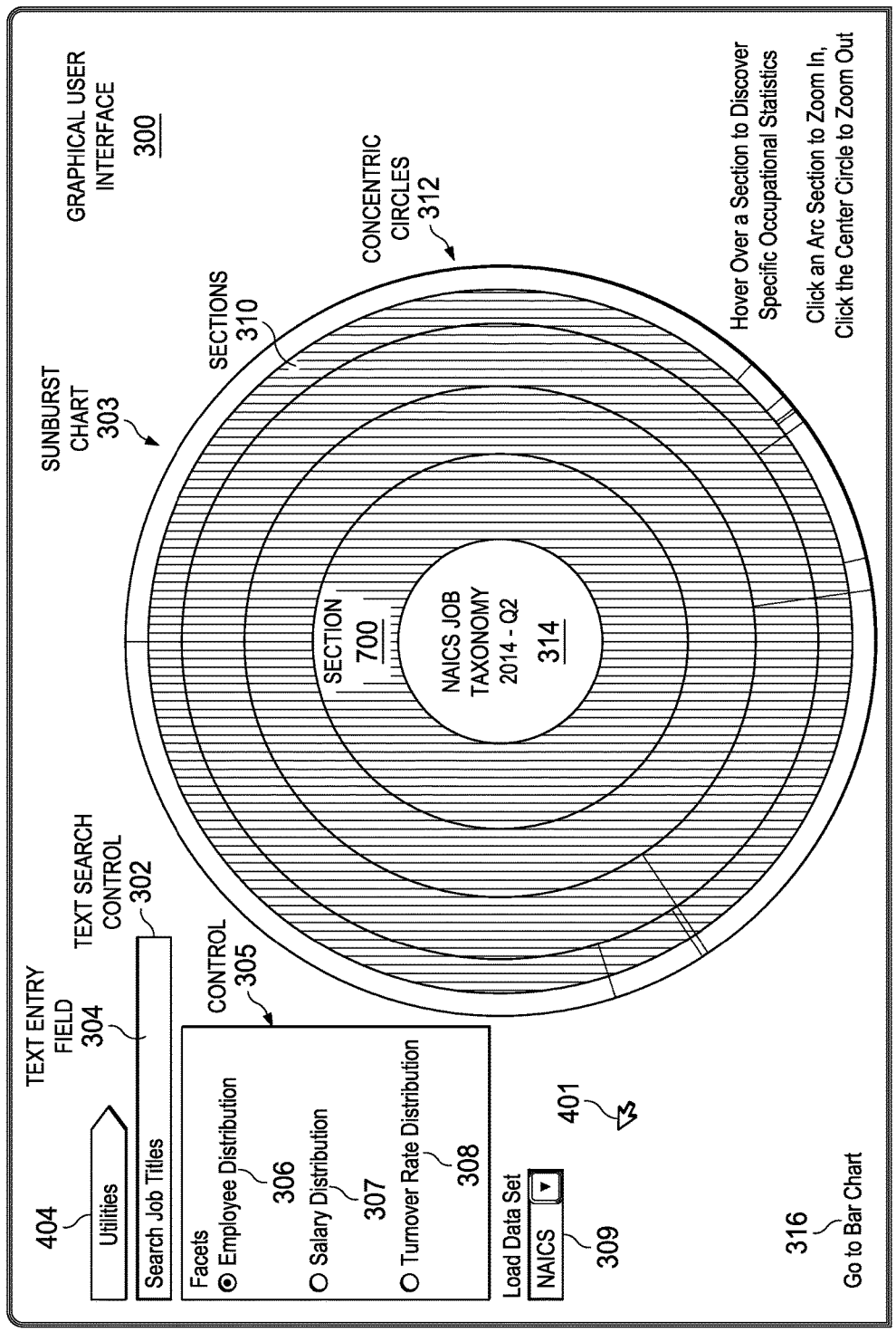
FIG. 8 is an illustration of a sunburst chart in a graphical user interface in accordance with an illustrative embodiment.

With reference to FIG. 8, an illustration of a sunburst chart in a graphical user interface is depicted in accordance with an illustrative embodiment. In this illustration, the emphasis on section 700 has been removed. Graphical user interface 300 removes emphasis on sections in sections 310 when pointer 401 is not over sections 310.

Figure 9:
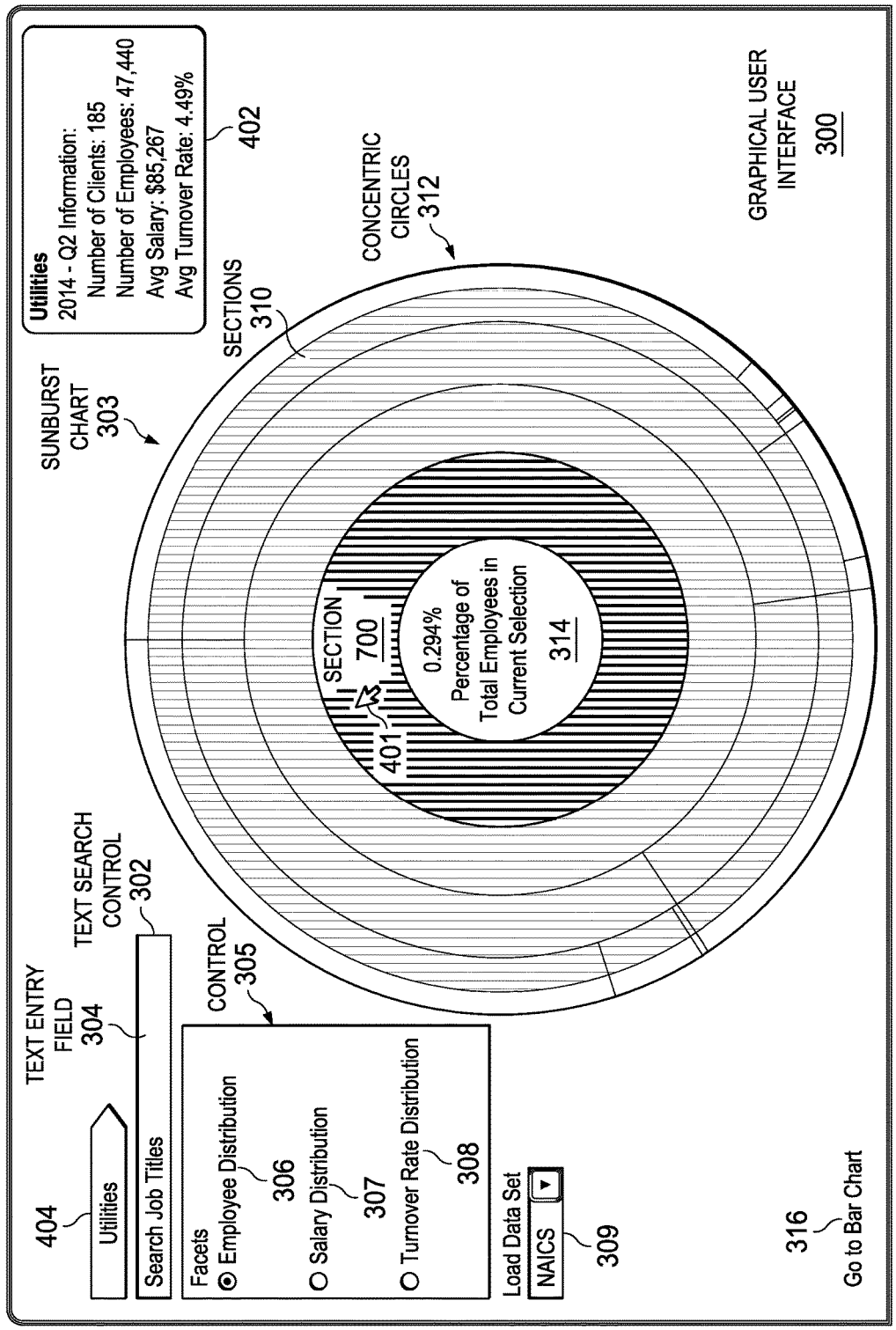
FIG. 9 is an illustration of a sunburst chart in a graphical user interface in accordance with an illustrative embodiment.

With reference next to FIG. 9, an illustration of a sunburst chart in a graphical user interface is depicted in accordance with an illustrative embodiment. In this illustration, the emphasis on section 700 is shown. Graphical user interface 300 shows the emphasis on section 700 when pointer 401 is over section 700.

Figure 10:
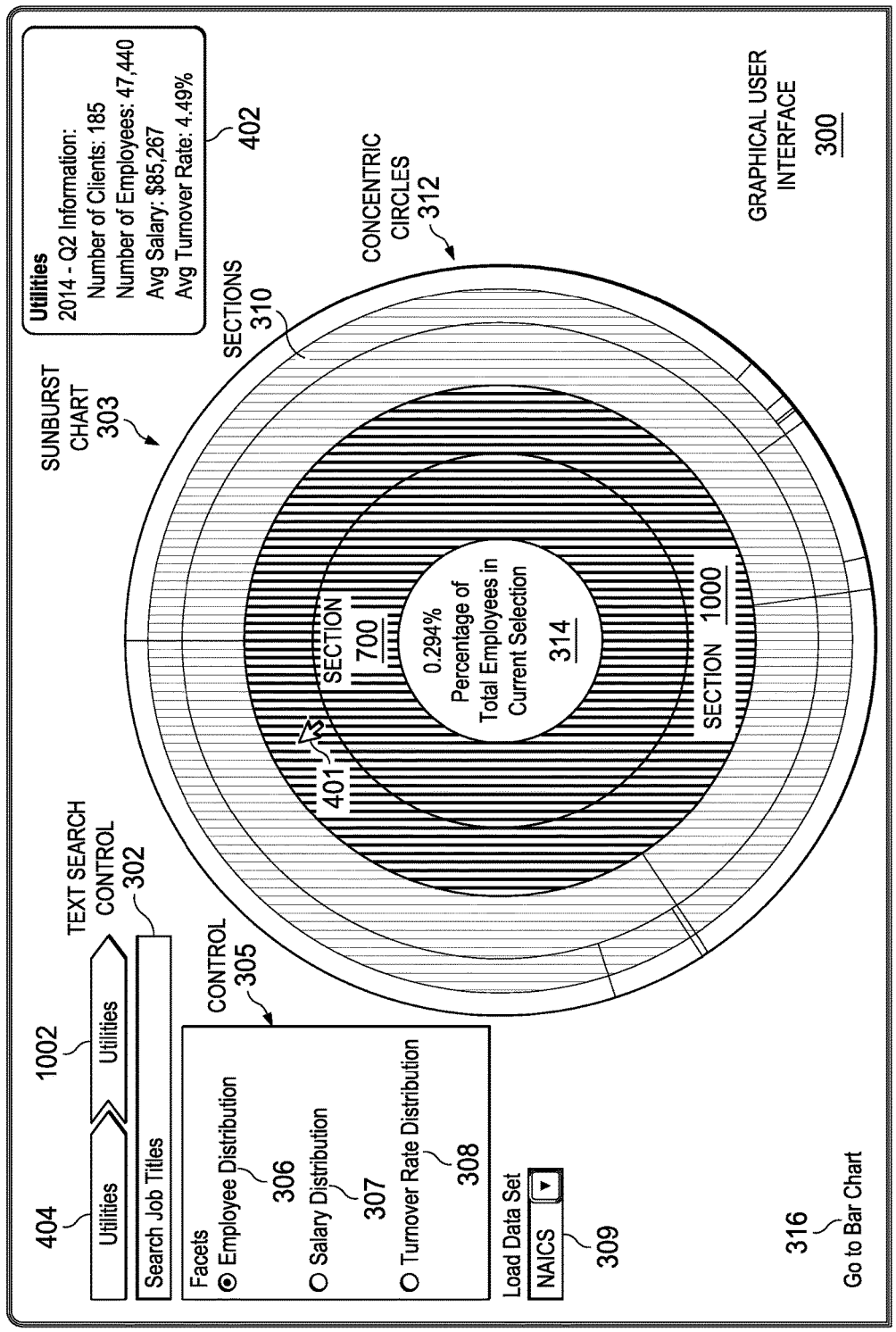
FIG. 10 is an illustration of a sunburst chart in a graphical user interface in accordance with an illustrative embodiment.

With reference now to FIG. 10, an illustration of a sunburst chart in a graphical user interface is depicted in accordance with an illustrative embodiment. In this illustration, an emphasis on section 1000 and section 700 is shown. Graphical user interface 300 shows the emphasis on section 1000 and section 700 when pointer 401 is over section 1000.

As depicted, section 1000 is in section 700 in the hierarchy for sections 310. Graphical user interface 300 includes segment 1002 for section 1000. Graphical user interface 300 shows segment 1002 as an additional emphasis on section 1000. In the illustrative example, segment 404 and segment 1002 form a bar that represents section 700 and section 1000.

Figure 11:
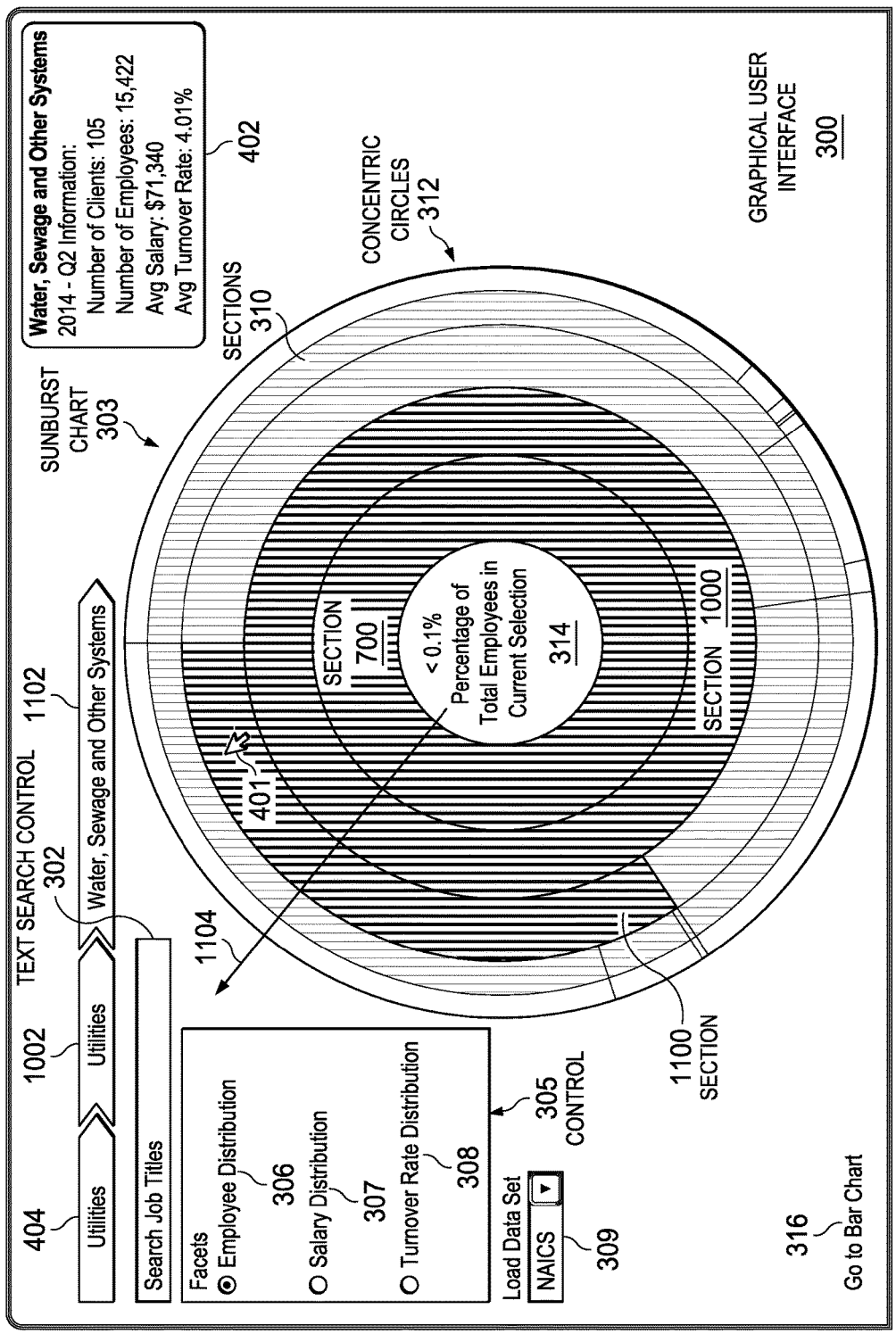
FIG. 11 is an illustration of a sunburst chart in a graphical user interface in accordance with an illustrative embodiment.

Turning to FIG. 11, an illustration of a sunburst chart in a graphical user interface is depicted in accordance with an illustrative embodiment. In this illustration, an emphasis on section 1100, section 1000 and section 700 is shown. Graphical user interface 300 shows the emphasis on section 1100, section 1000, and section 700 when pointer 401 is over section 1100.

As depicted, section 1100 is in section 1000 in the hierarchy for sections 310. Graphical user interface 300 includes segment 1102 for section 1100. Graphical user interface 300 shows segment 1102 as an additional emphasis on section 1100.

In the illustrative example, line 1104 shows an angle of section 1100 with respect to section 1000. This angle is an example of angle 136 shown in block diagram form in FIG. 1.

Figure 12:
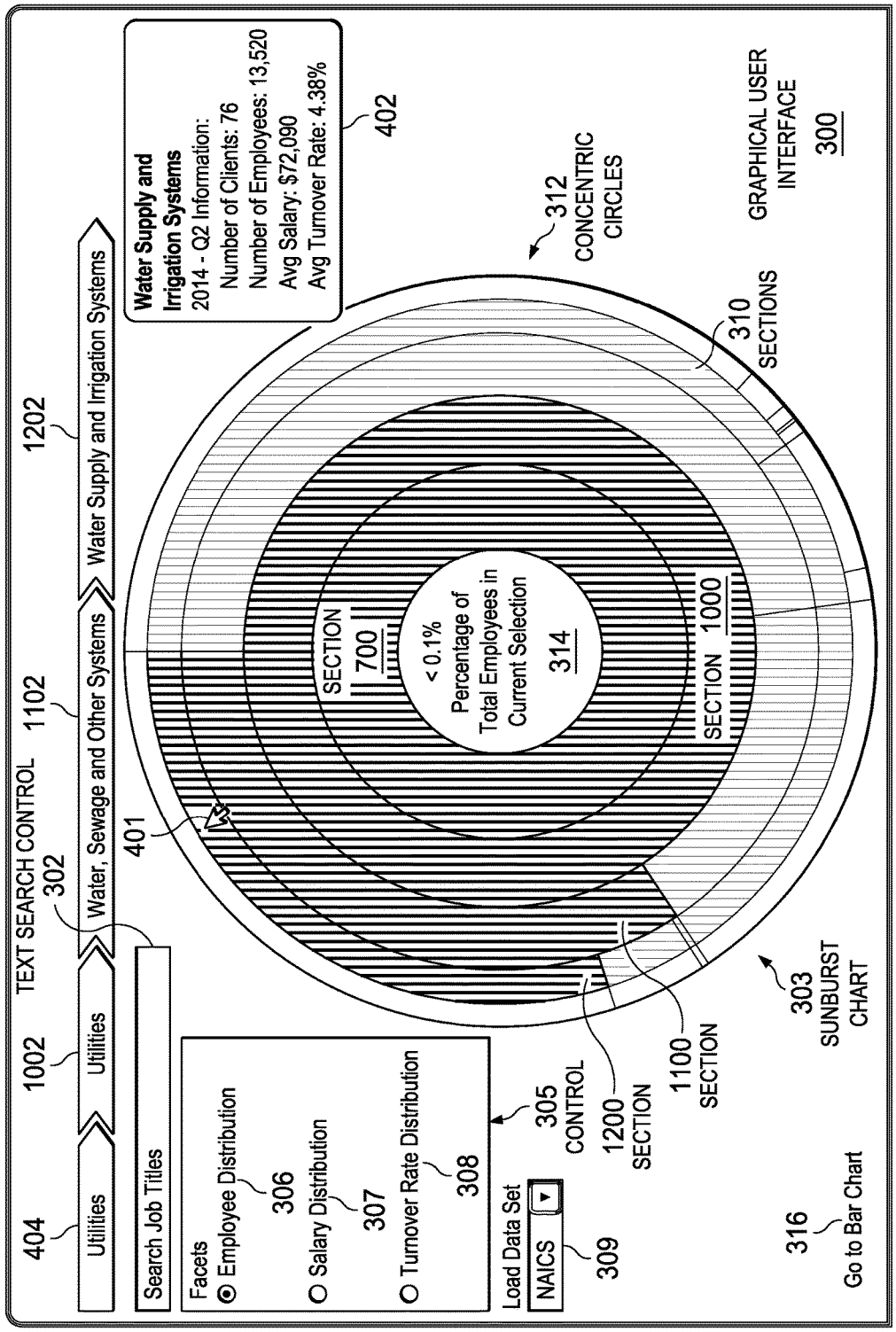
FIG. 12 is an illustration of a sunburst chart in a graphical user interface in accordance with an illustrative embodiment.

Turning next to FIG. 12, an illustration of a sunburst chart in a graphical user interface is depicted in accordance with an illustrative embodiment. In this illustration, an emphasis on section 1200, section 1100, section 1000, and section 700 is shown. Graphical user interface 300 shows the emphasis on section 1200, section 1100, section 1000, and section 700 when pointer 401 is over section 1200.

As depicted, section 1200 is in section 1100 in the hierarchy for sections 310. Graphical user interface 300 includes segment 1202 for section 1200. Graphical user interface 300 displays segment 1202 as an additional emphasis on section 1200.

Figure 13:
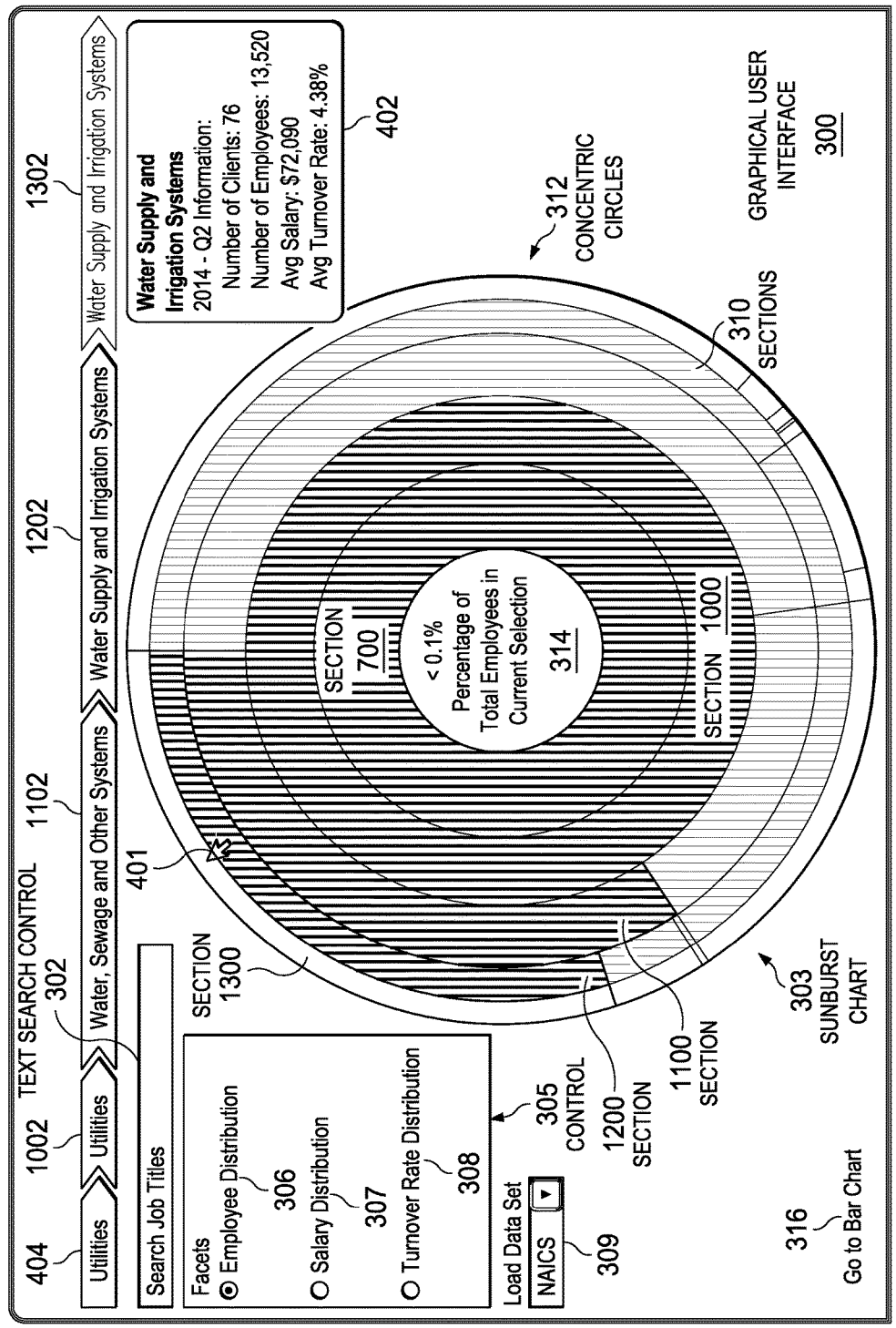
FIG. 13 is an illustration of a sunburst chart in a graphical user interface in accordance with an illustrative embodiment.

Turning now to FIG. 13, an illustration of a sunburst chart in a graphical user interface is depicted in accordance with an illustrative embodiment. In this illustration, an emphasis on section 1300, section 1200, section 1100, section 1000, and section 700 is shown. Graphical user interface 300 shows the emphasis on section 1300, section 1200, section 1100, section 1000, and section 700 when pointer 401 is over section 1300.

As depicted, section 1300 is in section 1200 in the hierarchy for sections 310. Graphical user interface 300 includes segment 1302 for section 1300. Graphical user interface 300 shows segment 1302 as an additional emphasis on section 1300.

Figure 14:
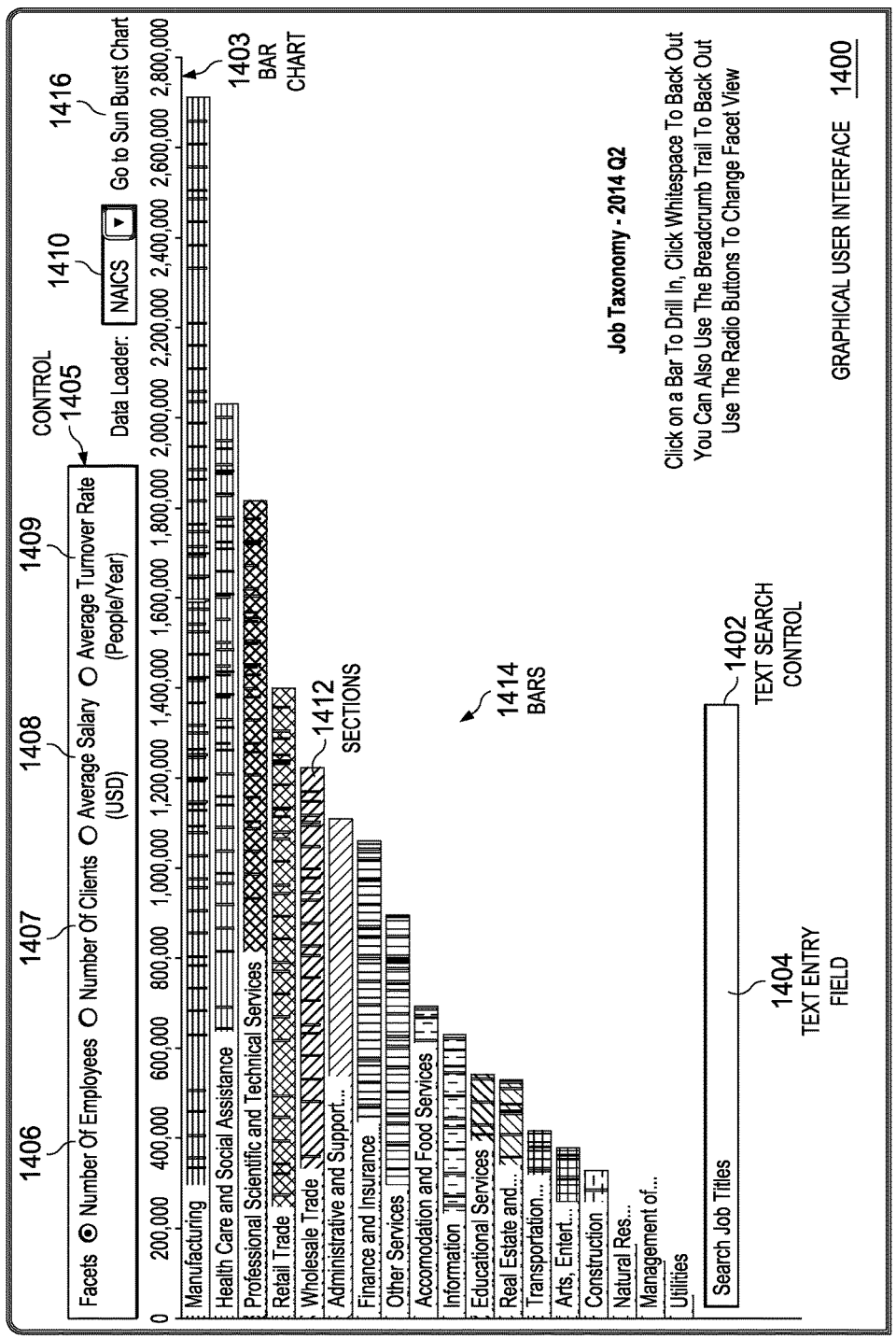
FIG. 14 is an illustration of a hierarchical chart with a text search control in a graphical user interface in accordance with an illustrative embodiment.

With reference next to FIG. 14, an illustration of a hierarchical chart with a text search control in a graphical user interface is depicted in accordance with an illustrative embodiment. As depicted, graphical user interface 1400 is an example of one implementation for graphical user interface 118 shown in block form in FIG. 1. In this illustration, link 316 in graphical user interface 300 in FIG. 3 has been selected.

In this illustrative example, graphical user interface 1400 includes a number of different graphical elements. As depicted, graphical user interface 1400 includes text search control 1402 and bar chart 1403.

Text search control 1402 is an example of text search control 140 shown in block diagram form in FIGS. 1-2. Bar chart 1403 is an example of hierarchical chart 150 shown in block diagram form in FIG. 1.

Text search control 1402 includes text entry field 1404. Text entered into text entry field 1404 is an example of selected text 206 in FIG. 2.

As depicted, graphical user interface 1400 also includes control 1405. Control 1405 includes radio button 1406, radio button 1407, radio button 1408, and radio button 1409. In this example, one of the radio buttons may be selected for choosing the type of information shown in bar chart 1403.

In this illustrative example, radio button 1406 has been selected. This radio button is for choosing "number of employees" as the type of information. Number of employees is the number of employees in sections of an organization. Number of employees is an example of a type of information in information 104 in FIG. 1.

Graphical user interface 1400 further includes control 1410. Control 1410 provides an ability to select names of organizations. Selecting a name of an organization causes information for the organization selected to be shown in bar chart 1403. In the illustrated example, the organization selected in control 1410 is organization 106.

In this illustrative example, sections 1412 are graphically displayed in bars 1414 in bar chart 1403. As depicted, the size of each section in sections 1412 is based on the number of employees in the section. Sections 1412 are an example of sections 130 shown in block diagram form in FIG. 1.

Each bar in bars 1414 represents a section of organization 106 in sections 1412. Bars 1414 represent a higher level in hierarchy for sections 1412 than sections in bars 1414.

As depicted, graphical user interface 1400 includes link 1416. Link 1416 is selected to switch to graphical user interface 300.

Figure 15:
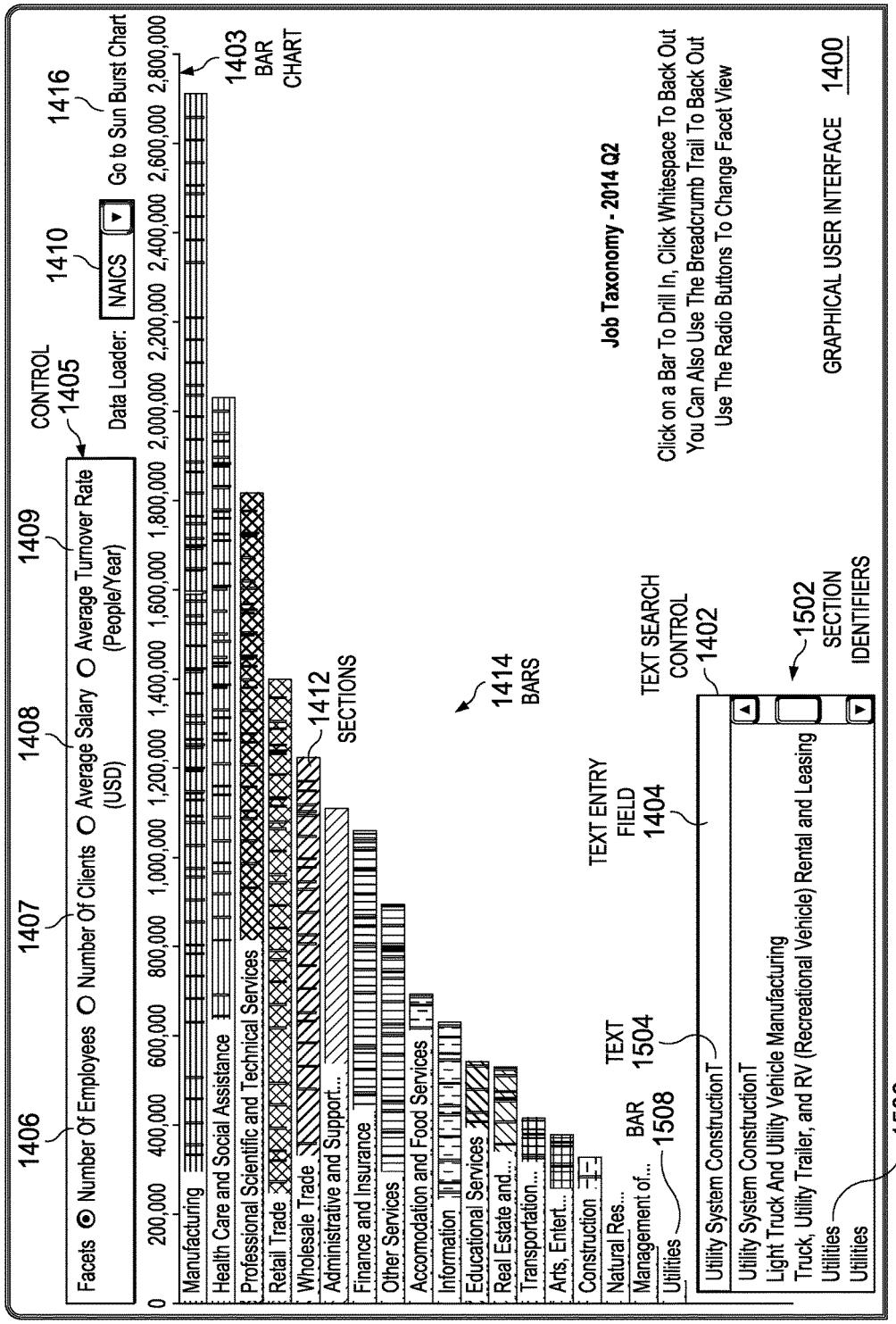
FIG. 15 is an illustration of text entered into a text search control for a hierarchical chart in a graphical user interface in accordance with an illustrative embodiment.

With reference now to FIG. 15, an illustration of text entered into a text search control for a hierarchical chart in a graphical user interface is depicted in accordance with an illustrative embodiment. In this illustrative example, section identifiers 1502 are included in text search control 1402. Section identifiers 1502 are an example of an implementation for section identifiers 218 shown in block diagram form in FIG. 2.

As depicted, text 1504 in text search control 1402 includes the text "util." In the illustrated example, text 1504 has been entered by operator 120. The section identifiers included in section identifiers 1502 match text 1504. As also depicted, an emphasis for the text "util" is shown on section identifiers 1502 to emphasize the match.

In this illustration, section identifier 1506 is located in section identifiers 1502. Section identifier 1506 is "utilities" which points to bar 1508 in bars 1414.

Figure 16:
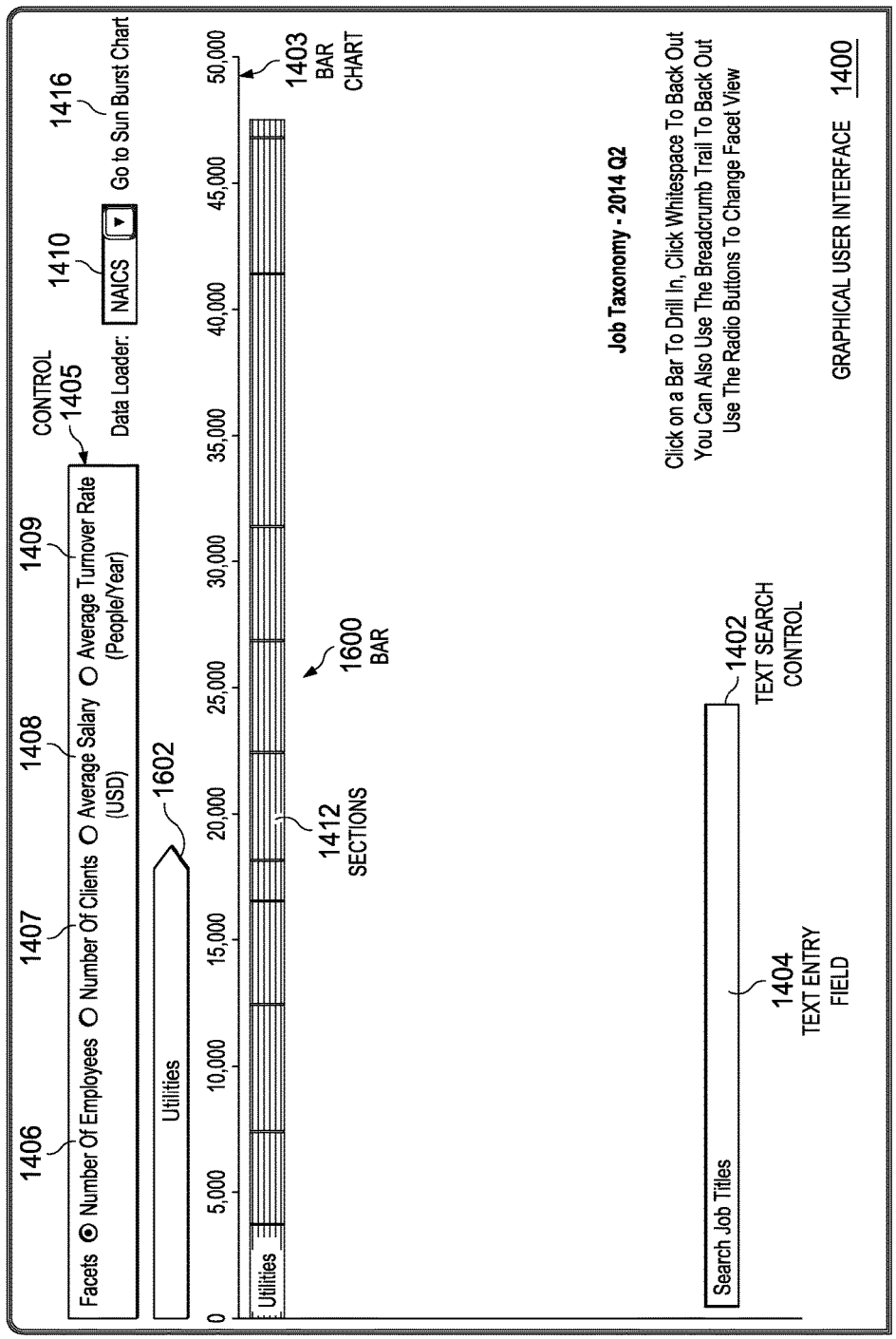
FIG. 16 is an illustration of a hierarchical chart in a graphical user interface in accordance with an illustrative embodiment.

With reference to FIG. 16, an illustration of a hierarchical chart in a graphical user interface is depicted in accordance with an illustrative embodiment. In this illustration, section identifier 1506 in FIG. 15 has been selected.

As depicted, graphical user interface 1400 removes from sections 1412 the portion of sections 1412 that are not in bar 1508 in FIG. 15 when section identifier 1506 is selected in FIG. 15. Bar 1600 in bar chart 1403 represents the same section in organization 106 that bar 1508 represented in FIG. 15.

In this illustrative example, graphical user interface 1400 includes segment 1602 for bar 1600. Graphical user interface 1400 shows segment 1602 as an emphasis on bar 1600.

Turning next to FIG. 17, an illustration of a flowchart of a process for accessing information is depicted in accordance with an illustrative embodiment. The process illustrated in FIG. 17 may be implemented in information environment 100 in FIG. 1. In particular, the process may be implemented in viewer 108 in computer system 112 in FIG. 1.

The process begins by displaying sections in a chart in a graphical user interface in a display system (step 1700). In one example, the chart is a hierarchical chart and may be a sunburst chart. The process displays a text search control in the graphical user interface along with the chart (step 1702). The text search control is configured to receive text through user input.

The process identifies a selection of a plurality of sections displayed in the graphical user interface from the user input to the text search control (step 1704). The process emphasizes the plurality of the sections in the chart (step 1706), with the process terminating thereafter. When the chart is a hierarchical chart, such as a sunburst chart, the plurality of the sections are associated with each other and enable increased efficiency in viewing the information.

Turning next to FIG. 18, an illustration of a flowchart of a process for searching for desired information in a chart using a text search control is depicted in accordance with an illustrative embodiment. The process illustrated in FIG. 18 may be implemented in information environment 100 in FIG. 1. In particular, the process may be implemented in viewer 108 in computer system 112 in FIG. 1.

The process begins by identifying selected text from user input to a text search control (step 1800). The process searches for a portion of sections of a hierarchical chart that match selected text based on section descriptions (step 1802).

The process next generates a group of section identifiers for the portion of sections that match the selected text (step 1804). The process places the group of section identifiers into the text search control as selectable section identifiers in the text search control (step 1806). The process identifies a group of selected sections from user input to the selectable section identifiers in the text search control (step 1808).

The process then modifies the display of the hierarchical chart to indicate which sections in the sections is the group of selected sections (step 1810), with the process terminating thereafter. For example, the process may indicate which sections in the sections are the group of selected sections by at least one of removing from the sections any sections not in the group of selected sections, or by highlighting the group of selected sections in sections through graphical emphasis.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
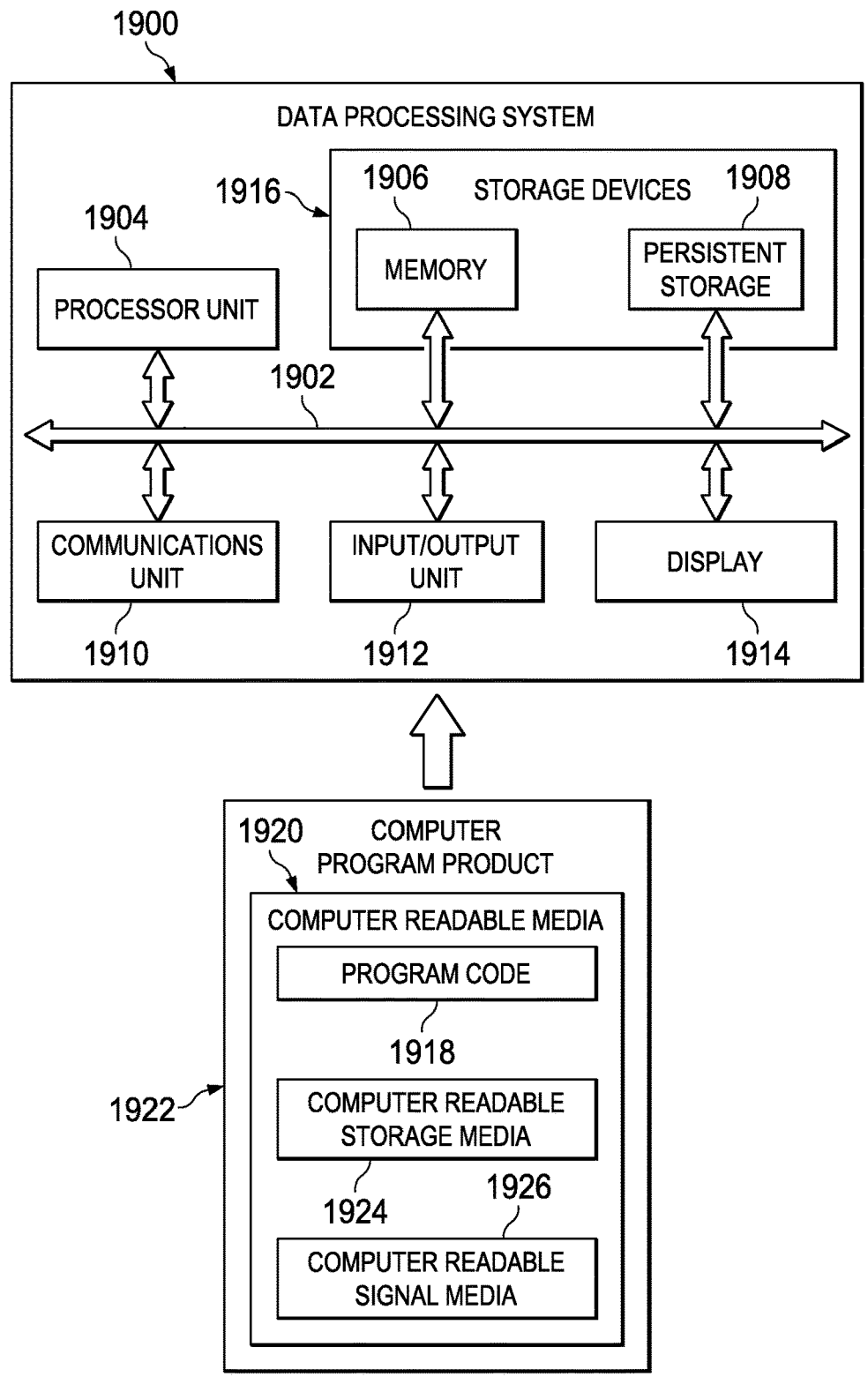
FIG. 19 is an illustration of a block diagram of a data processing system in accordance with an illustrative embodiment.

Turning now to FIG. 19, an illustration of a block diagram of a data processing system is depicted in accordance with an illustrative embodiment. Data processing system 1900 may be used to implement one or more computers in computer system 112 in FIG. 1. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 may take the form of a bus system.

Processor unit 1904 serves to execute instructions for software that may be loaded into memory 1906. Processor unit 1904 may be a number of processors, a multi-processor core, or some other type of processor, depending on the particular implementation.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 may also be referred to as computer readable storage devices in these illustrative examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that may be connected to data processing system 1900. For example, input/output unit 1912 may provide a connection for user input through at least of a keyboard, a mouse, or some other suitable input device. Further, input/output unit 1912 may send output to a printer. Display 1914 provides a mechanism to display information to a user.

Instructions for at least one of the operating system, applications, or programs may be located in storage devices 1916, which are in communication with processor unit 1904 through communications framework 1902. The processes of the different embodiments may be performed by processor unit 1904 using computer-implemented instructions, which may be located in a memory, such as memory 1906.

These instructions are referred to as program code, computer usable program code, or computer readable program code that may be read and executed by a processor in processor unit 1904. The program code in the different embodiments may be embodied on different physical or computer readable storage media, such as memory 1906 or persistent storage 1908.

Program code 1918 is located in a functional form on computer readable media 1920 that is selectively removable and may be loaded onto or transferred to data processing system 1900 for execution by processor unit 1904. Program code 1918 and computer readable media 1920 form computer program product 1922 in these illustrative examples. In one example, computer readable media 1920 may be computer readable storage media 1924 or computer readable signal media 1926.

In these illustrative examples, computer readable storage media 1924 is a physical or tangible storage device used to store program code 1918 rather than a medium that propagates or transmits program code 1918. Alternatively, program code 1918 may be transferred to data processing system 1900 using computer readable signal media 1926. Computer readable signal media 1926 may be, for example, a propagated data signal containing program code 1918. For example, computer readable signal media 1926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1900 are not meant to provide architectural limitations to the manner in which different embodiments may be implemented. The different illustrative embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code 1918.

Thus, the illustrative embodiments provide a method and apparatus for accessing information. With an illustrative example, visualization of information is provided using a chart displayed by a computer system in a graphical user interface in a display system. Additionally, a text search control is displayed along with the chart. The text search control facilitates finding information in the chart. The text search control receives user input that is used to identify information in the chart that is of interest. The identified information is emphasized in the chart in a manner that draws the attention of an operator viewing the chart to the information.

With the text search control, finding desired information is easier than searching through different sections in a chart such as a hierarchical chart. In this manner, an illustrative example provides a technical solution to the technical problem of visually searching for information displayed in charts having hierarchies.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for accessing information, the method comprising:
   displaying, by a computer system, a sunburst chart in a graphical user interface in a display system, wherein the information is displayed hierarchically as arcuate sections of concentric circles and wherein a relative inner section defines an angle encompassing a relative outer section that is associated with the inner section;
   receiving, by the computer system, user input of text into a text search control displayed in the graphical user interface;
   identifying, by the computer system, a selection of an associated plurality of sections displayed in the graphical user interface from the user input to the text search control;
   emphasizing, by the computer system, the associated plurality of sections in consecutive ones of the concentric circles in the graphical user interface, wherein the associated plurality of sections is associated with each other and enables increased efficiency in viewing the information;
   identifying a location of a pointer relative to the associated plurality of sections; and
   highlighting a group of sections in the associated plurality of sections based on the location of the pointer in a particular section of the group of sections, wherein the group of sections in the associated plurality of sections consists of the particular section and relative inner sections with which the particular section is associated, the relative inner sections being higher in a hierarchy than the particular section.

2. The method of claim 1, wherein receiving the user input of text into the text search control comprises:
   displaying, by the computer system, a text entry field, wherein the text entry field receives the text through a first user input; and
   displaying, by the computer system, a group of section identifiers in the graphical user interface that match the text entered into the text entry field when the text is entered into the text entry field;
   and wherein identifying, by the computer system, the selection of the associated plurality of sections displayed in the graphical user interface from the user input to the text search control comprises:
   identifying, by the computer system, a selected section from the group of section identifiers selected through a second user input, wherein the selection of the associated plurality of sections consists of the selected section and any relative outer sections associated with the selected section.

3. The method of claim 2, wherein the selected section is in a second portion of the sections and the plurality of sections is in a first portion of the sections.

4. The method of claim 3 further comprising:
   emphasizing, by the computer system, the selected section in the graphical user interface.

5. The method of claim 4 further comprising:
   displaying a bar with segments identifying a group of sections, wherein one of the segments identifies the selected section.

6. The method of claim 2 further comprising:
   displaying the sunburst chart with the associated plurality of sections without other sections that are not associated with the selected section when the selected section is selected, wherein the other sections in the sections are absent from the sunburst chart.

7. The method of claim 6, wherein the associated plurality of sections is lower in a hierarchy than the selected section.

8. The method of claim 6 further comprising:
   returning to displaying the sections in the sunburst chart in the display system when a center of a circular chart is selected.

9. A computer system comprising:
   a display system; and
   a viewer in communication with the display system, wherein the viewer displays a sunburst chart in a graphical user interface in a display system, wherein the information is displayed hierarchically as arcuate sections of concentric circles and wherein a relative inner section defines an angle encompassing a relative outer section that is associated with the inner section; displays a text search control in the graphical user interface, wherein the text search control receives text through user input; identifies a selection of an associated plurality of sections displayed in the graphical user interface from the user input to the text search control; emphasizes the associated plurality of sections in consecutive ones of the concentric circles in the graphical user interface, wherein the associated plurality of sections is associated with each other and enables increased efficiency in viewing the information; identifies a location of a pointer relative to the associated plurality of sections; and highlights a group of sections in the associated plurality of sections based on the location of the pointer a particular section of the group of sections, wherein the group of sections in the associated plurality of sections consists of the particular section and relative inner sections with which the particular section is associated, the relative inner sections being higher in a hierarchy than the particular section.

10. The computer system of claim 9, wherein in displaying the text search control in the graphical user interface, the viewer displays a text entry field, wherein the text entry field receives the text through a first user input; and displays a group of section identifiers in the graphical user interface that match the text entered into the text entry field when the text is entered into the text entry field; and wherein in identifying the selection of the associated plurality of sections displayed in the graphical user interface from the user input to the text search control, the viewer identifies a selected section from the group of section identifiers selected through a second user input, wherein the selection of the associated plurality of sections consists of the selected section and any relative outer sections associated with the selected section.

11. The computer system of claim 10, wherein the selected section is in a second portion of the sections and the plurality of sections is in a first portion of the sections.

12. The computer system of claim 11, wherein the viewer emphasizes the selected section in the graphical user interface.

13. The computer system of claim 12, wherein the viewer displays a bar with segments identifying a group of sections, wherein one of the segments identifies the selected section.

14. The computer system of claim 9, wherein the viewer identifies a set of sections associated with a selected section from the sections displayed in the sunburst chart and displays the sunburst chart with the associated plurality of sections without other sections that are not associated with the selected section when the selected section is selected, wherein the other sections in the sections are absent from the sunburst chart.

15. A computer program product for accessing information, the computer program product comprising:
   a computer readable storage media;
   first program code, stored on the computer readable storage media, for displaying a sunburst chart in a graphical user interface in a display system, wherein the information is displayed hierarchically as arcuate sections of concentric circles and wherein a relative inner section defines an angle encompassing a relative outer section that is associated with the inner section;
   second program code, stored on the computer readable storage media, for displaying a text search control in the graphical user interface, wherein the text search control receives text through user input;
   third program code, stored on the computer readable storage media, for identifying a selection of an associated plurality of sections displayed in the graphical user interface from the user input to the text search control;
   fourth program code, stored on the computer readable storage media, for emphasizing the associated plurality of sections in consecutive ones of the concentric circles in the graphical user interface, wherein the associated plurality of sections is associated with each other and enables increased efficiency in viewing the information;
   fifth program code, stored on the computer readable storage media, for identifying a location of a pointer relative to the associated plurality of sections; and
   sixth program code, stored on the computer readable storage media, for highlighting a group of sections in the associated plurality of sections based on the location of the pointer a particular section of the group of sections, wherein the group of sections in the associated plurality of sections consists of the particular section and relative inner sections with which the particular section is associated, the relative inner sections being higher in a hierarchy than the particular section.

16. The computer program product of claim 15, wherein the second program code comprises:
   program code, stored on the computer readable storage media, for displaying a text entry field, wherein the text entry field receives the text through a first user input; and
   program code, stored on the computer readable storage media, for displaying a group of section identifiers in the graphical user interface that match the text entered into the text entry field when the text is entered into the text entry field;
   and wherein the third program code comprises:
      program code, stored on the computer readable storage media, for identifying a selected section from the group of section identifiers selected through a second user input, wherein the selection of the associated plurality of sections consists of the selected section and any relative outer sections associated with the selected section.

17. The computer program product of claim 16, wherein the selected section is in a second portion of the sections and the plurality of sections is in a first portion of the sections.

18. The computer program product of claim 17 further comprising:
   fifth program code, stored on the computer readable storage media, for emphasizing the selected section in the graphical user interface.

19. A method for accessing information, the method comprising:
   displaying, by a computer system, sections in a hierarchical chart in a graphical user interface in a display system, wherein the sections represent the information, a first portion of the sections are located in a second portion of the sections, and the sections are displayed hierarchically in the hierarchical chart;
   receiving, by the computer system, user input of text into a text search control displayed in the graphical user interface;
   identifying, by the computer system, a selection of an associated plurality of sections displayed in the graphical user interface from the user input to the text search control;
   emphasizing, by the computer system, the associated plurality of sections in the graphical user interface, wherein the associated plurality of sections is associated with each other in a hierarchy of the information and enables increased efficiency in viewing the information;
   identifying a location of a pointer relative to the associated plurality of sections; and highlighting a group of sections in the associated plurality of sections based on the location of the pointer a particular section of the group of sections, wherein the group of sections in the associated plurality of sections consists of the particular section and sections with which the particular section is associated, the sections being higher in a hierarchy than the particular section.

20. The method of claim 19, wherein displaying, by the computer system, the text search control in the graphical user interface comprises:

displaying a text entry field, wherein the text entry field receives the text through a first user input; and displaying a group of section identifiers in the graphical user interface that match the text entered into the text entry field when the text is entered into the text entry field;

and wherein identifying, by the computer system, the selection of the associated plurality of sections displayed in the graphical user interface from the user input to the text search control comprises:

identifying, by the computer system, a selected section from the group of section identifiers selected through a second user input, wherein the selection of the associated plurality of sections is based on the selected section.

21. The method of claim 20, wherein the selected section is in a second portion of the sections and the plurality of sections is in a first portion of the sections.

22. The method of claim 21 further comprising:

emphasizing, by the computer system, the selected section in the graphical user interface.

23. The method of claim 22, wherein the hierarchical chart is a bar chart, and the first portion of the sections is bars in the bar chart.

* * * * *